(12) United States Patent
Yamarthi et al.

(10) Patent No.: US 12,297,743 B2
(45) Date of Patent: May 13, 2025

(54) GAS TURBINE ENGINE HAVING A SENSOR ASSEMBLY TO DETECT TORSIONAL VIBRATION

(71) Applicant: General Electric Company, Schenectady, NY (US)

(72) Inventors: David Yamarthi, Bengaluru (IN); Tod R. Steen, West Chester, OH (US); Ravindra Shankar Ganiger, Bengaluru (IN); Kudum Shinde, Bengaluru (IN); Ankita Sinha, Bengaluru (IN); Aman Srivastava, Lucknow (IN); Narayanan Payyoor, Bengaluru (IN); Venkata Subramanya Sarma Devarakonda, Bengaluru (IN); Rajesh Kumar Undipalli, Bengaluru (IN); Dinesh Rakwal, Bengaluru (IN); Himanshu Gupta, Bengaluru (IN); Hrishi Ragesh, Trivandrum (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/362,346

(22) Filed: Jul. 31, 2023

(65) Prior Publication Data
US 2025/0043692 A1   Feb. 6, 2025

(51) Int. Cl.
  *F01D 21/00*   (2006.01)
  *F01D 25/04*   (2006.01)
  *G01H 3/00*   (2006.01)

(52) U.S. Cl.
  CPC ......... *F01D 21/003* (2013.01); *F01D 25/04* (2013.01); *G01H 3/00* (2013.01); *F05D 2260/96* (2013.01);
  (Continued)

(58) Field of Classification Search
  CPC ..... F01D 21/003; F01D 25/04; F05D 2260/96
  See application file for complete search history.

(56) References Cited

U.S. PATENT DOCUMENTS

| 4,931,949 A | 6/1990 | Hernandez et al. |
| 5,541,857 A * | 7/1996 | Walter .................. G01H 1/006 |
| | | 73/660 |

(Continued)

FOREIGN PATENT DOCUMENTS

| CN | 112213129 A | 1/2021 |
| CN | 113950615 A | 1/2022 |

(Continued)

OTHER PUBLICATIONS

Advanced Telemetrics International, "Torsional Acceleration Monitoring Systems," https://www.atitelemetry.com/product/torsional-acceleration-monitoring-systems/, as viewed on Apr. 3, 2023.

(Continued)

*Primary Examiner* — Christopher R Legendre
(74) *Attorney, Agent, or Firm* — Venable LLP; Peter T. Hrubiec; Michele V. Frank

(57) ABSTRACT

A gas turbine engine includes a fan section having a plurality of fan blades, the fan section configured to generate an airflow through the gas turbine engine, an airflow passage having a core passage and a bypass passage separate from the core passage, a low-speed shaft coupled to and configured to rotate the plurality of fan blades, and a sensor assembly coupled to the gas turbine engine and configured to detect torsional vibration in the low-speed shaft. The sensor assembly includes a plurality of dynamic pressure sensors in the airflow passage. The plurality of dynamic pressure sensors detect a dynamic pressure of the airflow passage that is indicative of the torsional vibration in the low-speed shaft. A damping system is configured to dampen (Continued)

the torsional vibration in the low-speed shaft based on a correlation of a measured torsional vibration and an experimental torsional vibration.

20 Claims, 22 Drawing Sheets

(52) U.S. Cl.
CPC .. *F05D 2270/807* (2013.01); *F05D 2270/808* (2013.01)

(56) References Cited

U.S. PATENT DOCUMENTS

| | | | |
|---|---|---|---|
| 5,646,340 | A | 7/1997 | Gee et al. |
| 6,795,779 | B2 | 9/2004 | Delvaux et al. |
| 7,681,440 | B2 | 3/2010 | Thomassin et al. |
| 8,886,471 | B2 | 11/2014 | Hainz et al. |
| 8,958,995 | B2 | 2/2015 | Kar et al. |
| 9,121,927 | B2 | 9/2015 | Trujillo |
| 9,476,318 | B2 * | 10/2016 | Datchanamoorthy ........... F01D 21/003 |
| 9,632,009 | B2 | 4/2017 | Berger |
| 10,259,572 | B2 | 4/2019 | Hale et al. |
| 11,215,530 | B2 | 1/2022 | Smith |
| 2010/0284785 | A1 * | 11/2010 | Wadia ............... F04D 27/001 415/118 |
| 2010/0290906 | A1 * | 11/2010 | Moeckel ............. F01D 17/06 416/31 |

FOREIGN PATENT DOCUMENTS

| | | |
|---|---|---|
| FR | 3127024 A1 | 3/2023 |
| FR | 3127025 A1 | 3/2023 |

OTHER PUBLICATIONS

Tsao et al., 2004 IEEE International Conference on Electric Utility Deregulation, Restructuring and Power Technologies, "Torsional Interactions between an Electrical Arc Furnace Load and a Turbine-Generator Set," 2004, pp. 627-632, doi: 10.1109/DRPT.2004.1338059.

Arkkio et al., 2018 XIII International Conference on Electrical Machines (ICEM), "Reducing the losses of electrical machines under torsional vibration," 2018, pp. 1303-1309, doi: 10.1109/ICELMACH.2018.8507161.

* cited by examiner

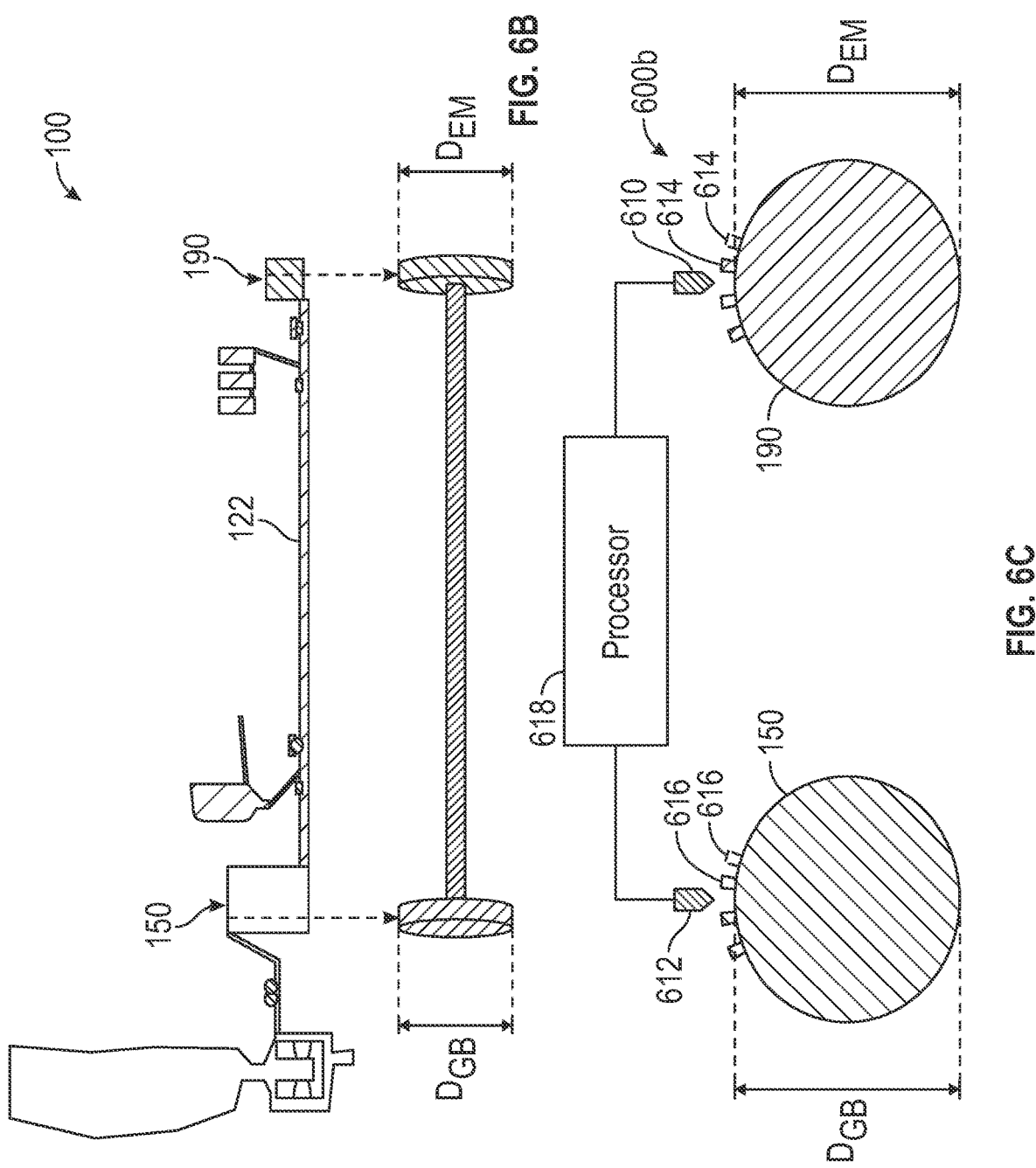

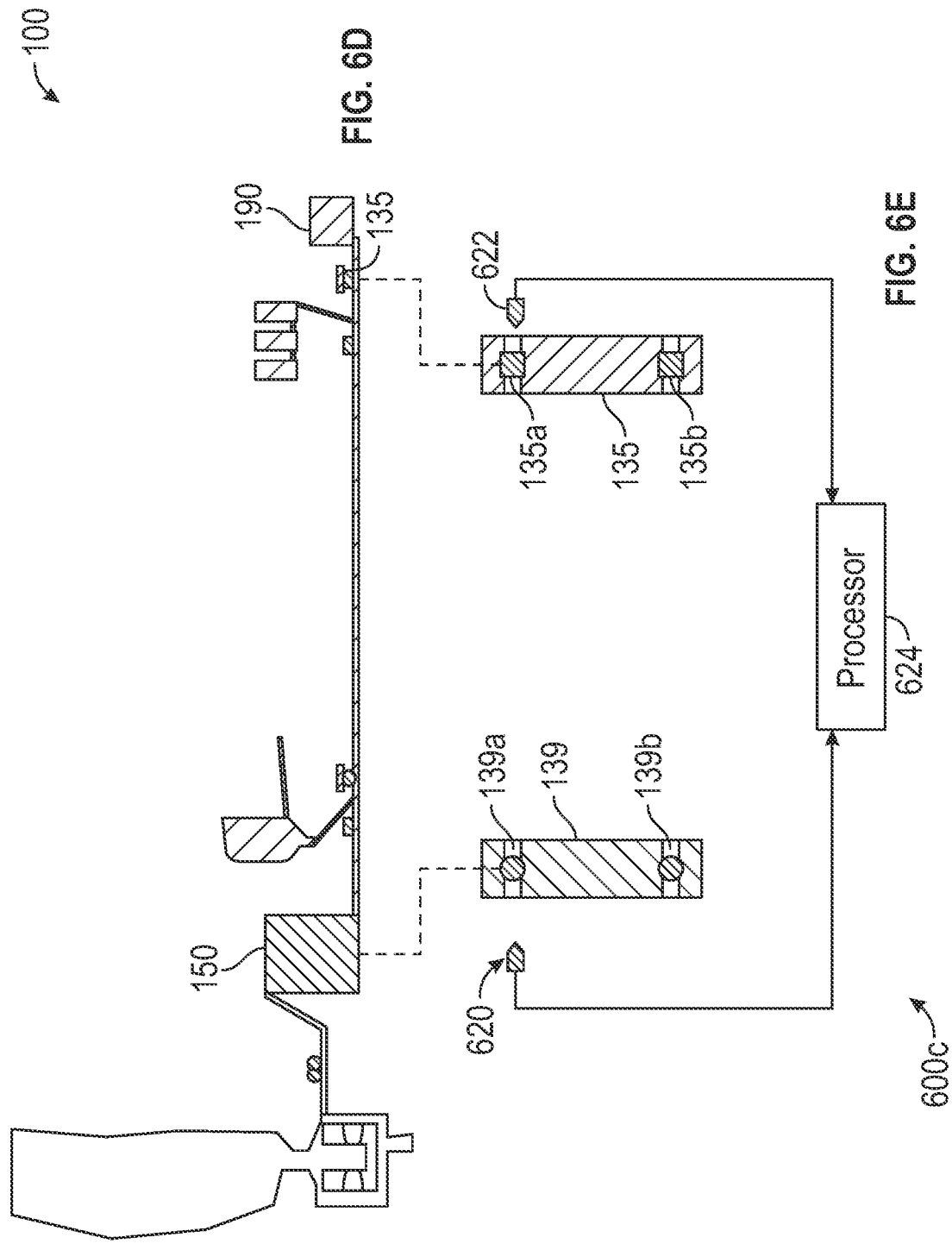

GAS TURBINE ENGINE HAVING A SENSOR ASSEMBLY TO DETECT TORSIONAL VIBRATION

TECHNICAL FIELD

The present disclosure relates generally to a gas turbine engine having a sensor assembly to detect torsional vibration.

BACKGROUND

A gas turbine engine generally includes a fan and a core section arranged in flow communication with one another, the core section including a low-pressure turbine. A low-speed shaft couples the low-pressure turbine to the fan.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIGS. 6B and 6C illustrate a sensor assembly for a gas turbine engine, such as the gas turbine engine described with respect to FIG. 2, according to the present disclosure.

FIGS. 6D and 6E illustrate a sensor assembly for a gas turbine engine, such as the gas turbine engine described with respect to FIG. 2, according to the present disclosure.

DETAILED DESCRIPTION

Figure 1:
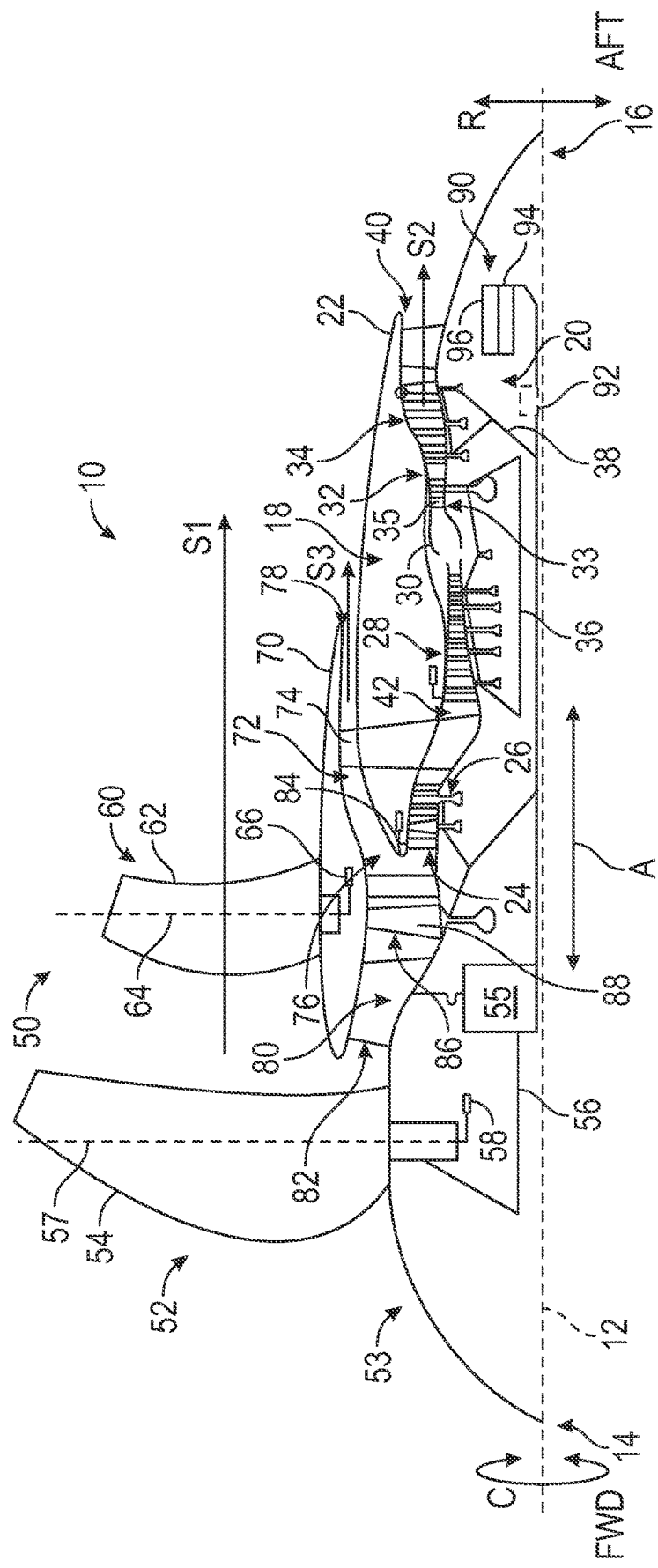
FIG. 1 illustrates a schematic, cross-sectional view of an unducted, three-stream gas turbine engine, taken along a longitudinal centerline axis of the engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or the vehicle. For example, with regard to a turbine engine, forward refers to a position closer to an engine inlet and aft refers to a position closer to an engine nozzle or an exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure describes systems and methods to monitor and to detect parameters that can indicate torsional dynamics, that is, torsional vibration performance in an engine. In some examples, the systems and methods are employed on experimental, demo, rig, or model engines to assist and to enhance field monitoring of the product (e.g., an engine or an aircraft). The systems and methods described herein employ various sensors to monitor the parameters that indicate torsional vibration. In some examples, the system includes sensors that monitor pressure pulse information of flow path. In some examples, the system includes sensors that monitor electric machine parameters. In some examples, the system includes sensors that employ "magnetic pickup" to detect torsional displacement. In some examples, the system includes rotary encoders. In some examples, the system includes one or more optical sensors or one or more high speed cameras. The example systems and methods described herein may allow for developing a correlation matrix for torsional performance based on the engine testing.

FIG. 1 shows a schematic view of an unducted, three-stream, gas turbine engine 10 for an aircraft that may incorporate one or more embodiments of the present disclosure. The gas turbine engine 10 is a "three-stream engine" in that its architecture provides three distinct streams (labeled S1, S2, and S3) of thrust-producing airflow during operation, as detailed further below.

As shown in FIG. 1, the gas turbine engine 10 defines an axial direction A, a radial direction R, and a circumferential direction C. Moreover, the gas turbine engine 10 defines a longitudinal centerline axis 12 that extends along the axial direction A. In general, the axial direction A extends parallel to the longitudinal centerline axis 12, the radial direction R extends outward from, and inward to, the longitudinal centerline axis 12 in a direction orthogonal to the axial direction A, and the circumferential direction C extends three hundred sixty degrees(360°) around the longitudinal centerline axis 12. The gas turbine engine 10 extends between a forward end 14 and an aft end 16, e.g., along the axial direction A.

The gas turbine engine 10 includes a core engine 20 and a fan assembly 50 positioned upstream thereof. Generally, the core engine 20 includes, in serial flow order, a compressor section, a combustion section, a turbine section, and an exhaust section. Particularly, as shown in FIG. 1, the core engine 20 includes an engine core 18 and a core cowl 22 that annularly surrounds the core engine 20. The engine core 18 includes a high-pressure (HP) compressor 28, a combustor 30, and a high-pressure (HP) turbine 32. The core engine 20 and the core cowl 22 define a core inlet 24 having an annular shape. The core cowl 22 further encloses and supports a low-pressure (LP) compressor 26 (also referred to as a booster) for pressurizing the air that enters the core engine 20 through core inlet 24. The HP compressor 28 receives pressurized air from the LP compressor 26 and further increases the pressure of the air. The pressurized air flows downstream to the combustor 30 where fuel is injected into the pressurized air and ignited to raise the temperature and the energy level of the pressurized air, thereby generating combustion gases.

The combustion gases flow from the combustor 30 downstream to the HP turbine 32. The HP turbine 32 drives the HP compressor 28 through a first shaft, also referred to as a high-pressure (HP) shaft 36 (also referred to as a high-speed shaft). In this regard, the HP turbine 32 is drivingly coupled with the HP compressor 28. The combustion gases then flow to a power turbine or a low-pressure (LP) turbine 34. The LP turbine 34 drives the LP compressor 26 and components of the fan assembly 50 through a second shaft, also referred to as a low-pressure (LP) shaft 38 (also referred to as a low-speed shaft). In this regard, the LP turbine 34 is drivingly coupled with the LP compressor 26 and components of the fan assembly 50. The low-speed shaft 38 is coaxial with the high-speed shaft 36 in the embodiment of FIG. 1. After driving each of the HP turbine 32 and the LP turbine 34, the combustion gases exit the engine core 18 through a core exhaust nozzle 40. The core engine 20 defines a core flowpath, also referred to as a core duct 42, that extends between the core inlet 24 and the core exhaust nozzle 40. The core duct 42 is an annular duct positioned generally inward of the core cowl 22 along the radial direction R.

The fan assembly 50 includes a primary fan 52. For the embodiment of FIG. 1, the primary fan 52 is an open rotor fan, also referred to as an unducted fan. However, in other embodiments, the primary fan 52 may be ducted, e.g., by a fan casing or a nacelle circumferentially surrounding the primary fan 52. The primary fan 52 includes an array of fan blades 54 (only one shown in FIG. 1). The fan blades 54 are rotatably coupled to a hub 53 for rotation about the longitudinal centerline axis 12 via a fan shaft 56. As shown in FIG. 1, the fan shaft 56 is coupled with the low-speed shaft 38 via a speed reduction gearbox, also referred to as a gearbox assembly 55, e.g., in an indirect-drive configuration. The gearbox assembly 55 is shown schematically in FIG. 1. The gearbox assembly 55 includes a plurality of gears for adjusting the rotational speed of the fan shaft 56 and, thus, the primary fan 52 relative to the low-speed shaft 38 to a more efficient rotational fan speed. The fan gearbox assembly may have a gear ratio of 4:1 to 12:1, or 7:1 to 12:1, or 4:1 to 10:1, or 5:1 to 9:1, or 6:1 to 9:1, and may be configured in an epicyclic star or a planet gear configuration. The gearbox may be a single stage or a compound gearbox.

The fan blades 54 can be arranged in equal spacing around the longitudinal centerline axis 12. Each fan blade 54 has a root and a tip, and a span defined therebetween. Each fan blade 54 defines a central blade axis 57. For the embodiment of FIG. 1, each fan blade 54 of the primary fan 52 is rotatable about its respective central blade axis 57, e.g., in unison with one another. One or more actuators 58 are controlled to pitch the fan blades 54 about their respective central blade axis 57. In other embodiments, each fan blade 54 is fixed or is unable to be pitched about the central blade axis 57.

The fan assembly 50 further includes a fan guide vane array 60 that includes fan guide vanes 62 (only one shown in FIG. 1) disposed around the longitudinal centerline axis 12. For the embodiment of FIG. 1, the fan guide vanes 62 are not rotatable about the longitudinal centerline axis 12. Each fan guide vane 62 has a root and a tip, and a span defined therebetween. The fan guide vanes 62 can be unshrouded as shown in FIG. 1 or can be shrouded, e.g., by an annular shroud spaced outward from the tips of the fan guide vanes 62 along the radial direction R. Each fan guide vane 62 defines a central vane axis 64. For the embodiment of FIG. 1, each fan guide vane 62 of the fan guide vane array 60 is rotatable about its respective central vane axis 64, e.g., in unison with one another. One or more actuators 66 are controlled to pitch the fan guide vanes 62 about their respective central vane axis 64. In other embodiments, each fan guide vane 62 is fixed or is unable to be pitched about the central vane axis 64. The fan guide vanes 62 are mounted to a fan cowl 70.

The fan cowl 70 annularly encases at least a portion of the core cowl 22 and is generally positioned outward of the core cowl 22 along the radial direction R. Particularly, a downstream section of the fan cowl 70 extends over a forward portion of the core cowl 22 to define a fan flowpath, also referred to as a fan duct 72. Incoming air enters through the fan duct 72 through a fan duct inlet 76 and exits through a fan exhaust nozzle 78 to produce propulsive thrust. The fan duct 72 is an annular duct positioned generally outward of the core duct 42 along the radial direction R. The fan cowl 70 and the core cowl 22 are connected together and supported by a plurality of struts 74 (only one shown in FIG. 1) that extend substantially radially and are circumferentially spaced about the longitudinal centerline axis 12. The plurality of struts 74 are each aerodynamically contoured to direct air flowing thereby. Other struts in addition to the plurality of struts 74 can be used to connect and to support the fan cowl 70 and/or the core cowl 22.

The gas turbine engine 10 also defines or includes an inlet duct 80. The inlet duct 80 extends between an engine inlet 82 and the core inlet 24 and the fan duct inlet 76. The engine inlet 82 is defined generally at the forward end of the fan cowl 70 and is positioned between the primary fan 52 and the fan guide vane array 60 along the axial direction A. The inlet duct 80 is an annular duct that is positioned inward of the fan cowl 70 along the radial direction R. Air flowing downstream along the inlet duct 80 is split, not necessarily evenly, into the core duct 42 and the fan duct 72 by a splitter 84 of the core cowl 22. The inlet duct 80 is wider than the core duct 42 along the radial direction R. The inlet duct 80 is also wider than the fan duct 72 along the radial direction R.

The fan assembly 50 also includes a mid-fan 86. The mid-fan 86 includes a plurality of mid-fan blades 88 (only one shown in FIG. 1). The plurality of mid-fan blades 88 are rotatable, e.g., about the longitudinal centerline axis 12. The mid-fan 86 is drivingly coupled with the LP turbine 34 via the low-speed shaft 38. The plurality of mid-fan blades 88 can be arranged in equal circumferential spacing about the longitudinal centerline axis 12. The plurality of mid-fan blades 88 are annularly surrounded (e.g., ducted) by the fan cowl 70. In this regard, the mid-fan 86 is positioned inward of the fan cowl 70 along the radial direction R. The mid-fan 86 is positioned within the inlet duct 80 upstream of both the core duct 42 and the fan duct 72. A ratio of a span of a fan blade 54 to that of a mid-fan blade 88 (a span is measured from a root to tip of the respective blade) is greater than two and less than ten, to achieve the desired benefits of the third stream S3, particularly, the additional thrust the ratio offers to the gas turbine engine 10, which may enable a smaller diameter fan blade 54, which, in turn, can benefit engine installation.

Accordingly, air flowing through the inlet duct 80 flows across the plurality of mid-fan blades 88 and is accelerated downstream thereof. At least a portion of the air accelerated by the mid-fan blades 88 flows into the fan duct 72 and is ultimately exhausted through the fan exhaust nozzle 78 to produce propulsive thrust. Also, at least a portion of the air accelerated by the plurality of mid-fan blades 88 flows into the core duct 42 and is ultimately exhausted through the core exhaust nozzle 40 to produce propulsive thrust. Generally, the mid-fan 86 is a compression device positioned downstream of the engine inlet 82. The mid-fan 86 is operable to accelerate air into the fan duct 72, also referred to as a secondary bypass passage.

During operation of the gas turbine engine 10, an initial or incoming airflow passes through the fan blades 54 of the primary fan 52 and splits into a first airflow and a second airflow. The first airflow bypasses the engine inlet 82 and flows generally along the axial direction A outward of the fan cowl 70 along the radial direction R. The first airflow accelerated by the fan blades 54 passes through the fan guide vanes 62 and continues downstream thereafter to produce a primary propulsion stream or a first thrust stream S1. A majority of the net thrust produced by the gas turbine engine 10 is produced by the first thrust stream S1. The second airflow enters the inlet duct 80 through the engine inlet 82.

The second airflow flowing downstream through the inlet duct 80 flows through the plurality of mid-fan blades 88 of the mid-fan 86 and is consequently compressed. The second airflow flowing downstream of the mid-fan blades 88 is split by the splitter 84 located at the forward end of the core cowl 22. Particularly, a portion of the second airflow flowing downstream of the mid-fan 86 flows into the core duct 42 through the core inlet 24. The portion of the second airflow that flows into the core duct 42 is progressively compressed by the LP compressor 26 and the HP compressor 28, and is ultimately discharged into the combustion section. The discharged pressurized air stream flows downstream to the combustor 30 where fuel is introduced to generate combustion gases or products.

The combustor 30 defines an annular combustion chamber that is generally coaxial with the longitudinal centerline axis 12. The combustor 30 receives pressurized air from the HP compressor 28 via a pressure compressor discharge outlet. A portion of the pressurized air flows into a mixer. Fuel is injected by a fuel nozzle (omitted for clarity) to mix with the pressurized air, thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, a first stage turbine nozzle of the HP turbine 32. The first stage turbine nozzle 33 is defined by an annular flow channel that includes a plurality of radially extending, circumferentially spaced nozzle vanes 35 that turn the combustion gases so that the combustion gases flow angularly and impinge upon first stage turbine blades of the HP turbine 32. The combustion gases exit the HP turbine 32 and flow through the LP turbine 34, and exit the core duct 42 through the core exhaust nozzle 40 to produce a core air stream, also referred to as a second thrust stream S2. As noted above, the HP turbine 32 drives the HP compressor 28 via the high-speed shaft 36, and the LP turbine 34 drives the LP compressor 26, the primary fan 52, and the mid-fan 86, via the low-speed shaft 38.

The other portion of the second airflow flowing downstream of the mid-fan 86 is split by the splitter 84 into the fan duct 72. The air enters the fan duct 72 through the fan duct inlet 76. The air flows generally along the axial direction A through the fan duct 72 and is ultimately exhausted from the fan duct 72 through the fan exhaust nozzle 78 to produce a third stream, also referred to as the third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties), and thereby a percent contribution to total thrust, are passively adjusted during engine operation or can be modified purposefully through use of engine control features (such as fuel flow, electric machine power, variable stators, variable inlet guide vanes, valves, variable exhaust geometry, or fluidic features) to adjust or to improve overall system performance across a broad range of potential operating conditions.

The gas turbine engine 10 depicted in FIG. 1 is by way of example only. In other embodiments, the gas turbine engine 10 may have any other suitable configuration. For example, in other embodiments, the primary fan 52 may be configured in any other suitable manner (e.g., as a fixed pitch fan) and further may be supported using any other suitable fan frame (e.g., fan frame 98 of FIG. 3) configuration. In other embodiments, the primary fan 52 can be ducted by a fan casing or a nacelle such that a bypass passage is defined between the fan casing and the fan cowl 70. Moreover, in other embodiments, any other suitable number or configuration of compressors, turbines, shafts, or a combination thereof may be provided. In still other embodiments, aspects of the present disclosure may be incorporated into any other suitable turbine engine, such as, for example, turbofan engines, propfan engines, turbojet engines, turboprop, turboshaft engines, and/or turbine engines defining two streams (e.g., a bypass stream and a core air stream).

Further, for the depicted embodiment of FIG. 1, the gas turbine engine 10 includes an electric machine 90, which may be a motor-generator, operably coupled with a rotating component thereof. In this regard, the gas turbine engine 10 is a hybrid-electric propulsion machine. Particularly, as shown in FIG. 1, the electric machine 90 is operatively coupled with the low-speed shaft 38. The electric machine 90 can be mechanically connected to the low-speed shaft 38, either directly, or indirectly, e.g., by way of a gearbox assembly 92 (shown schematically in FIG. 1). Further, although, in this embodiment the electric machine 90 is operatively coupled with the low-speed shaft 38 at an aft end of the low-speed shaft 38, the electric machine 90 can be coupled with the low-speed shaft 38 at any suitable location or can be coupled to other rotating components of the gas turbine engine 10, such as the high-speed shaft 36 or the low-speed shaft 38. For instance, in some embodiments, the electric machine 90 can be coupled with the low-speed shaft 38 and positioned forward of the mid-fan 86 along the axial direction.

In some embodiments, the electric machine 90 can be an electric motor operable to drive or to motor the low-speed shaft 38, e.g., during an engine burst. In other embodiments, the electric machine 90 can be an electric generator operable to convert mechanical energy into electrical energy. In this way, electrical power generated by the electric machine 90 can be directed to various engine and/or aircraft systems. In some embodiments, the electric machine 90 can be a motor/generator with dual functionality. The electric machine 90 includes a rotor 94 and a stator 96. The rotor 94 is coupled to the low-speed shaft 38 and rotates with rotation of the low-speed shaft 38. In this way, the rotor 94 rotates with respect to the stator 96, thereby generating electrical power. Although the electric machine 90 has been described and illustrated in FIG. 1 as having a particular configuration, the present disclosure may apply to electric machines having alternative configurations. For instance, the rotor 94 and/or the stator 96 may have different configurations or may be arranged in a different manner than illustrated in FIG. 1.

Figure 2:
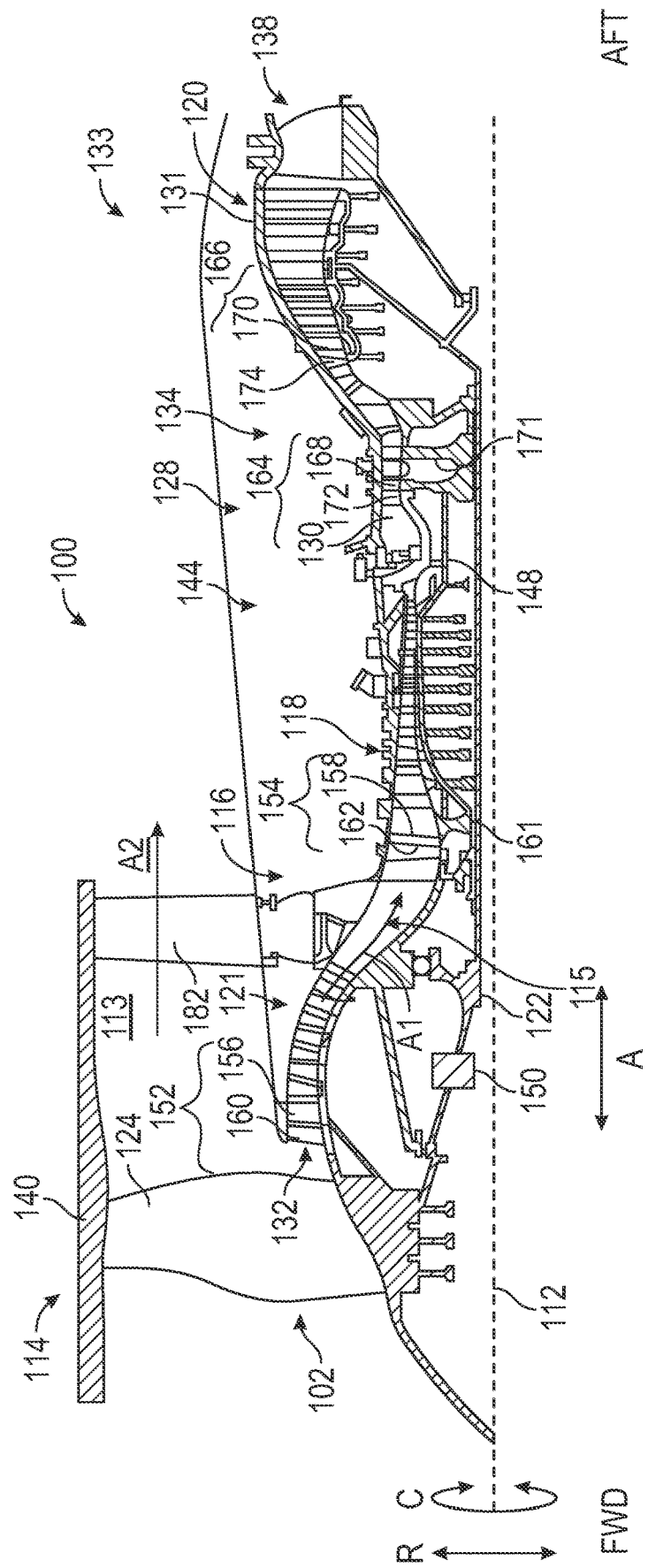
FIG. 2 illustrates a schematic, cross-sectional view of a ducted, indirect-drive gas turbine engine, taken along a longitudinal centerline axis of the engine, according to the present disclosure.

FIG. 2 shows a schematic, cross-sectional view of a ducted, indirect-drive, gas turbine engine 100, also referred to as turbine engine 100, taken along a longitudinal centerline axis 112 of the gas turbine engine 100, according to an embodiment of the present disclosure. The gas turbine engine 100, also referred to herein as a turbine engine 100, includes, in downstream serial flow relationship, a fan section 114 including a fan 102, a compressor section 116 including a booster or a low-pressure (LP) compressor 121 and a high-pressure (HP) compressor 118, a combustion section 128 including a combustor 130, a turbine section 133 including an HP turbine 134, an LP turbine 120, and an exhaust nozzle 138.

The fan section 114 includes a fan casing 140, which is secured to a nacelle (omitted for clarity) surrounding the fan 102. The fan 102 includes a plurality of fan blades 124 disposed radially about the longitudinal centerline axis 112. The HP compressor 118, the combustor 130, and the HP turbine 134 form an engine core 144 of the turbine engine 100, which generates combustion gases. The engine core 144 is surrounded by a core casing 131, which is coupled to the fan casing 140. The fan casing 140 is supported relative to the turbomachine by circumferentially spaced outlet guide vanes 182.

A high-speed shaft 148, also referred to herein as a high-pressure shaft, is disposed coaxially about the longitudinal centerline axis 112 of the turbine engine 100 and drivingly connects the HP turbine 134 to the HP compressor 118. A low-speed shaft 122, also referred to herein as a low-pressure shaft 122, which is disposed coaxially about the longitudinal centerline axis 112 of the turbine engine 100 and within the larger diameter, annular, high-speed shaft 148, drivingly connects the LP turbine 120 to the LP compressor 121 and the fan 102 (either directly or through a gearbox assembly 150). The high-speed shaft 148 and the low-speed shaft 122 are rotatable about the longitudinal centerline axis 112.

The LP compressor 121 and the HP compressor 118, respectively, include a respective plurality of compressor stages 152, 154, in which a respective set of compressor blades 156, 158 rotate relative to a respective set of compressor vanes 160, 162 to compress or to pressurize gas entering through the inlet 132. Referring now only to the HP compressor 118, a single compressor stage 154 includes multiple compressor blades 158 provided on a rotor disk 161 (or the blades and the disk are integrated together, referred to as a blisk). A compressor blade extends radially outwardly relative to the longitudinal centerline axis 112, from a blade platform to a blade tip. Compressor vanes 162 are positioned upstream/downstream of and adjacent to rotating compressor blades 158. The rotor disk 161 for a stage of compressor blades 158 is mounted to the high-speed shaft 148. A stage of the HPC refers to a single disk of rotor blades or both the rotor blades and adjacent stator vanes either meaning can apply within the context of this disclosure without loss of clarity).

The HP turbine 134 has one or two turbine stages 164. In a single turbine stage 164 turbine blades 168 are provided on a rotor disk 171. A turbine blade extends radially outwardly relative to the longitudinal centerline axis 112, from a blade platform to a blade tip. The HP turbine 134 can also include a stator vane 172. The HP turbine 134 may have both an upstream nozzle adjacent the combustor exit and an exit nozzle aft of the rotor, or a nozzle upstream of rotor blades or downstream of the rotor blades.

Air exiting the HP turbine 134 enters the LP turbine 120, which has a plurality of stages of rotating blades 170. The LP turbine 120 can have three, four, five, or six stages. In a single LP turbine stage 166 (containing a plurality of blades coupled to the LP shaft 122) a turbine blade is provided on a rotor disk (connected to the LP shaft 122) and extends radially outwardly relative to the longitudinal centerline axis 112, from a blade platform to a blade tip. The LP turbine 120 can also include a stator vane 174. The LP turbine 120 may have both an upstream nozzle and an exit nozzle aft of a stage, followed by the exhaust nozzle 138.

The turbine engine 100 of FIG. 2 operates in a similar manner as the engine 10 of FIG. 1. Airflow exiting the fan section 114 is split such that a first portion of the airflow A1 is channeled into an inlet 132 to a core passage 115. The core passage 115 includes the LP compressor 121, the HP compressor 118, the LP turbine 120, the HP turbine 134, the LP turbine 120, and the exhaust nozzle 138. The airflow A1 flows to the LP compressor 121, which then supplies pressurized airflow to the HP compressor 118, which further pressurizes the air. The pressurized airflow from the HP compressor 118 is mixed with fuel in the combustor 130 and ignited, thereby generating combustion gases. Some work is extracted from the combustion gases by the HP turbine 134, which drives the HP compressor 118 to produce a self-sustaining combustion. The combustion gases discharged from the HP turbine 134 enter the LP turbine 120, which extracts additional work to drive the LP compressor 121 and the fan 102 (directly or through a gearbox assembly 150). The gas discharged from the LP turbine 120 exits through the exhaust nozzle 138.

A second portion of the airflow A2 bypasses the engine core 144 and flows through a bypass passage 113 created by the fan casing 140. The airflow A2 is used for cooling of portions, especially hot portions, of the turbine engine 100, and/or used to cool or to power other aspects of the aircraft. In the context of the turbine engine 100, the hot portions refer to a variety of portions of the turbine engine 100 downstream of the combustion section 128 (e.g., the turbine section 133). Other sources of cooling fluid include, but are not limited to, fluid discharged from the LP compressor 121 or the HP compressor 118. Although not illustrated in FIG. 2, the engine 100 may include an electric machine operably coupled to the low-speed shaft 122. The electric machine may be the same as or similar to the electric machine 90 of FIG. 1.

The gas turbine engines 10 and 100, also referred to herein as engines 10 and 100, depicted and described with respect to FIG. 1 and FIG. 2, respectively, are by way of example only. In other embodiments, the gas turbine engine may have any other suitable configuration, including, for example, any other suitable number or configurations of shafts or spools, fan blades, turbines, compressors, or combination thereof. The gearbox assembly may have any suitable configuration, including, for example, a star gear configuration, a planet gear configuration, a single-stage, a multi-stage, epicyclic, non-epicyclic, etc., as detailed further below. The gearbox may have a gear ratio in a range of 3:1 to 4:1, 3:5 to 4:1, 3.25:1 to 3.5:1, or 4:1 to 5:1. The fan assembly may be any suitable fixed-pitched assembly or variable-pitched assembly. The gas turbine engine may include additional components not shown in FIG. 1, such as rotor blades, stator vanes, etc. The fan assembly may be configured in any other suitable manner (e.g., as a fixed pitch fan) and further may be supported using any other suitable fan frame configuration. Aspects of the present disclosure may be incorporated into any other suitable turbine engine, including, but not limited to, turbofan engines, propfan engines, turbojet engines, turboprop, and turboshaft engines.

Figure 3A:
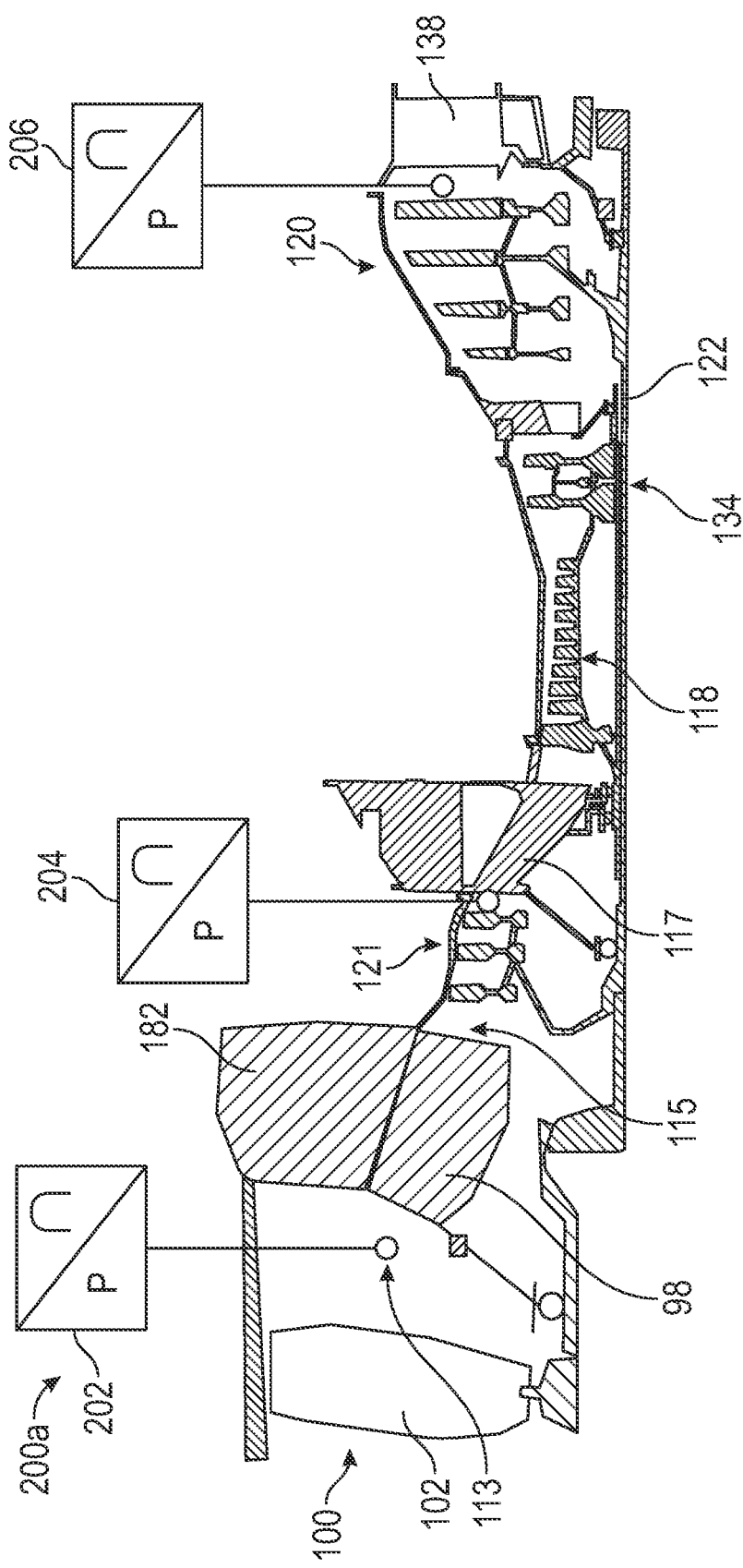
FIG. 3A illustrates a sensor assembly for a gas turbine engine, such as the gas turbine engine described with respect to FIG. 2, according to the present disclosure.
Figure 3B:
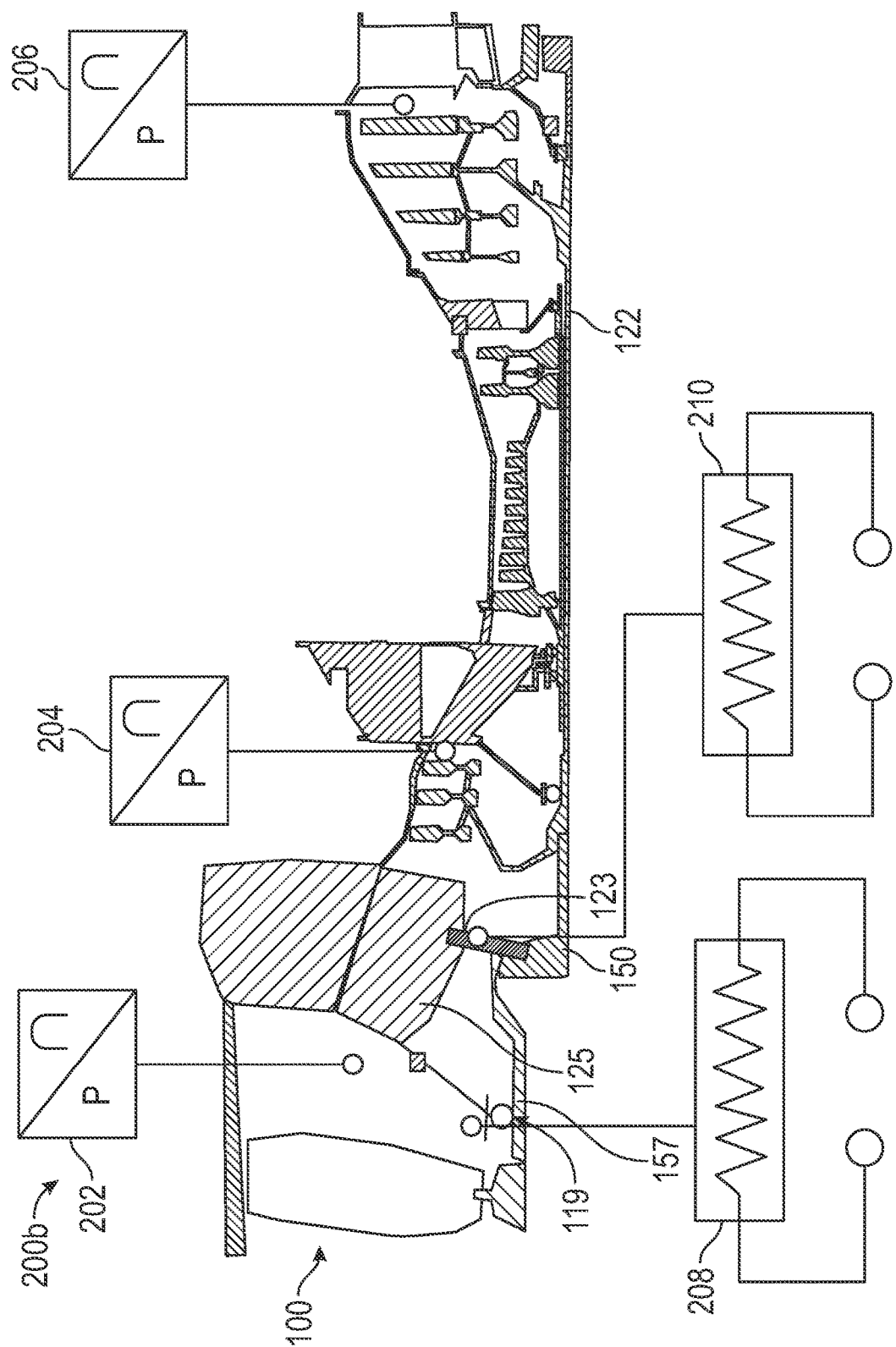
FIG. 3B illustrates a sensor assembly for a gas turbine engine, such as the gas turbine engine described with respect to FIG. 2, according to the present disclosure.
Figure 3C:
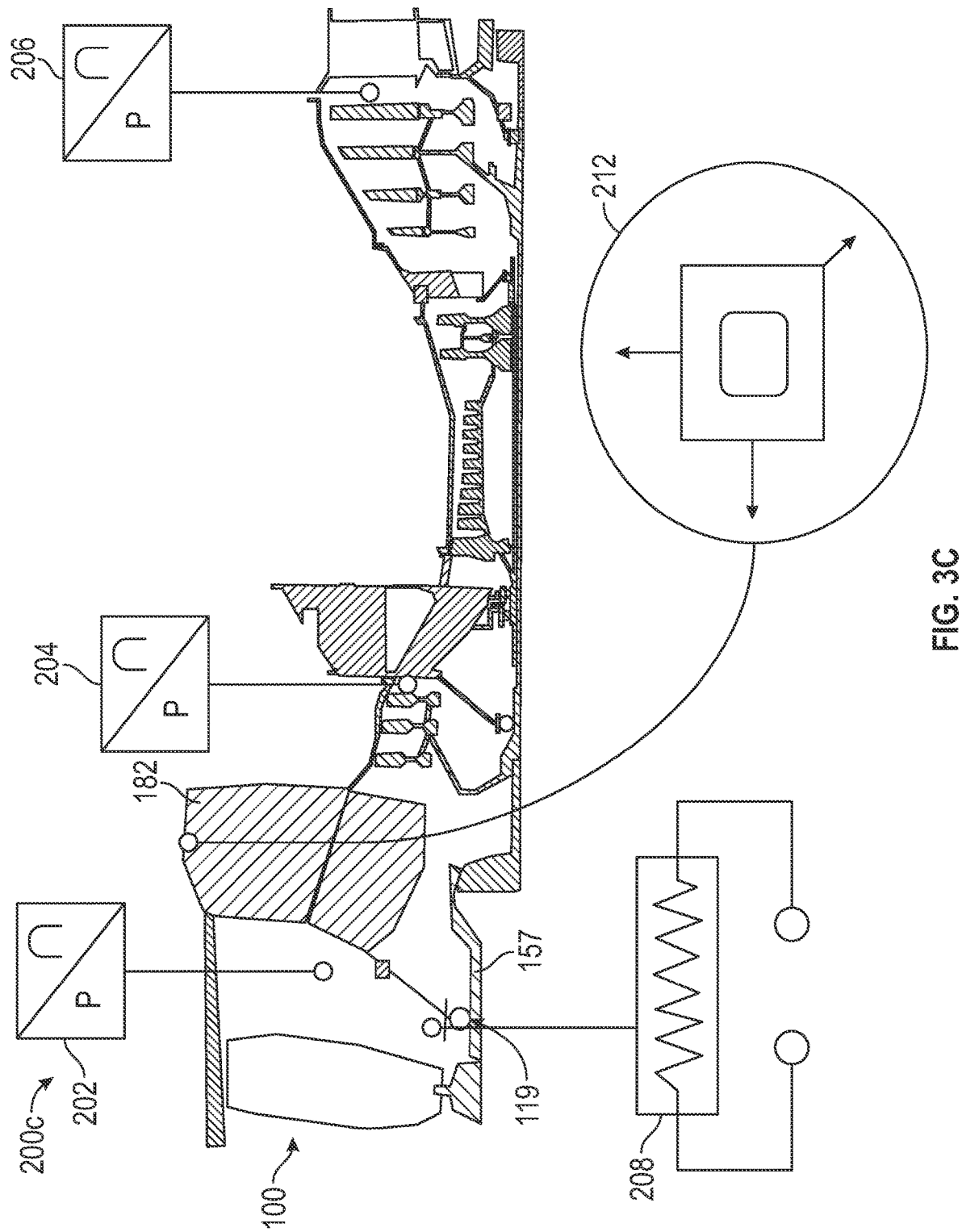
FIG. 3C illustrates a sensor assembly for a gas turbine engine, such as the gas turbine engine described with respect to FIG. 2, according to the present disclosure.

FIGS. 3A to 3C illustrate exemplary sensor assemblies for monitoring dynamic torque and torsional frequency in the turbine engine 100. The sensor assemblies of FIGS. 3A to 3C monitor a dynamic pressure of the engine flow path (e.g., the bypass passage 113 and the core passage 115) that is indicative of the dynamic torque and torsional frequency in the turbine engine 100. The following description includes references back to the turbine engine 100 and, thus, like numbers represent like features of the turbine engine 100. Although illustrated in the turbine engine 100, the sensor assemblies of FIGS. 3A to 3C may be provided in the turbine engine 10 (FIG. 1), or other turbine engines.

FIG. 3A illustrates an exemplary sensor assembly 200a. The sensor assembly 200a includes a first dynamic pressure sensor 202, a second dynamic pressure sensor 204, and a third dynamic pressure sensor 206. Although three dynamic pressure sensors are depicted and described, more or fewer may be provided. The first dynamic pressure sensor 202 may be located in the bypass passage 113 between the fan 102 and the outlet guide vane 182. The second dynamic pressure sensor 204 may be located in the core passage 115 between the low-pressure compressor and a frame 117. The third dynamic pressure sensor 206 may be located in the core passage 115 between the low-pressure turbine 120 and the exhaust nozzle 138.

FIG. 3B illustrates an exemplary sensor assembly 200b for monitoring dynamic torque and torsional frequency in the turbine engine 100. The sensor assembly 200b may be the same as or similar to the sensor assembly 200a with the addition of a first strain gauge 208 and a second strain gauge 210. Although two strain gauges are depicted and described, more or fewer may be provided. As with the aspect of FIG. 3A, more or fewer pressure sensors may be provided. The first strain gauge 208 may be located on a bearing housing of a forward bearing assembly 119, also referred to herein as a fan shaft bearing assembly 119. The second strain gauge 210 may be located on a static portion of a gearbox bearing assembly 123 coupling the gearbox assembly 150 to a forward frame 125. The first strain gauge 208 may be located on the bearing housing of the forward bearing assembly 119 to cancel out a noise signal from the dynamic pressure sensors 202, 204, 206. The second strain gauge 210 may be located on a stator of the gearbox assembly 150 to monitor a frequency of vibration of the gearbox assembly 150.

FIG. 3C illustrates an exemplary sensor assembly 200c for monitoring dynamic torque and torsional frequency in the turbine engine 100. The sensor assembly 200c may be the same as or similar to the sensor assembly 200a with the addition of the first strain gauge 208 and an accelerometer 212. As with the aspect FIG. 3A, more or fewer sensors may be provided. The first strain gauge 208 may be located on the bearing housing of the forward bearing assembly 119, as described with respect to FIG. 3B. The accelerometer 212 may be located on the frame surrounding the outlet guide vane 182. The data or the signal from the accelerometer 212 may be used to cancel out a noise signal from the dynamic pressure sensors 202, 204, and 206.

The sensor assemblies 200a, 200b, and 200c of FIGS. 3A to 3C may provide dynamic pressure measurement devices in the engine flow path (e.g., in the bypass passage 113 and the core passage 115). In some examples, the sensor assembly includes only a single dynamic pressure sensor. The dynamic pressure sensors 202, 204, and 206 are located near or adjacent to anti-nodal locations on the drive train of the engine (e.g., the fan 102, the low-pressure compressor 121, and the low-pressure turbine 120). The dynamic pressure sensors 202, 204, and 206 may detect cavity resonance in the engine flow path. Correlations between regions of the flow path can be conducted to account for various phenomena, such as, for example, variable stator vane (VSV) fluctuations. Accordingly, the dynamic pressure sensors may monitor the pressure in the engine flow path, which may indicate dynamic torque in the engine. The signals from the strain gauges or the accelerometer may be used to cancel out engine generated noise from the signal.

FIGS. 4A to 4D illustrate exemplary sensor assemblies for monitoring dynamic torque and torsional frequency in the turbine engine 100. The sensor assemblies of FIGS. 4A to 4D monitor electric machine parameters indicative of torque and torsional frequency in the engine. The following description includes references back to the turbine engine 100 and, thus, like numbers represent like features of the turbine engine 100. Although illustrated in the turbine engine 100, the sensor assemblies of FIGS. 4A to 4D may be provided in the turbine engine 10, or other turbine engines.

Figure 4A:
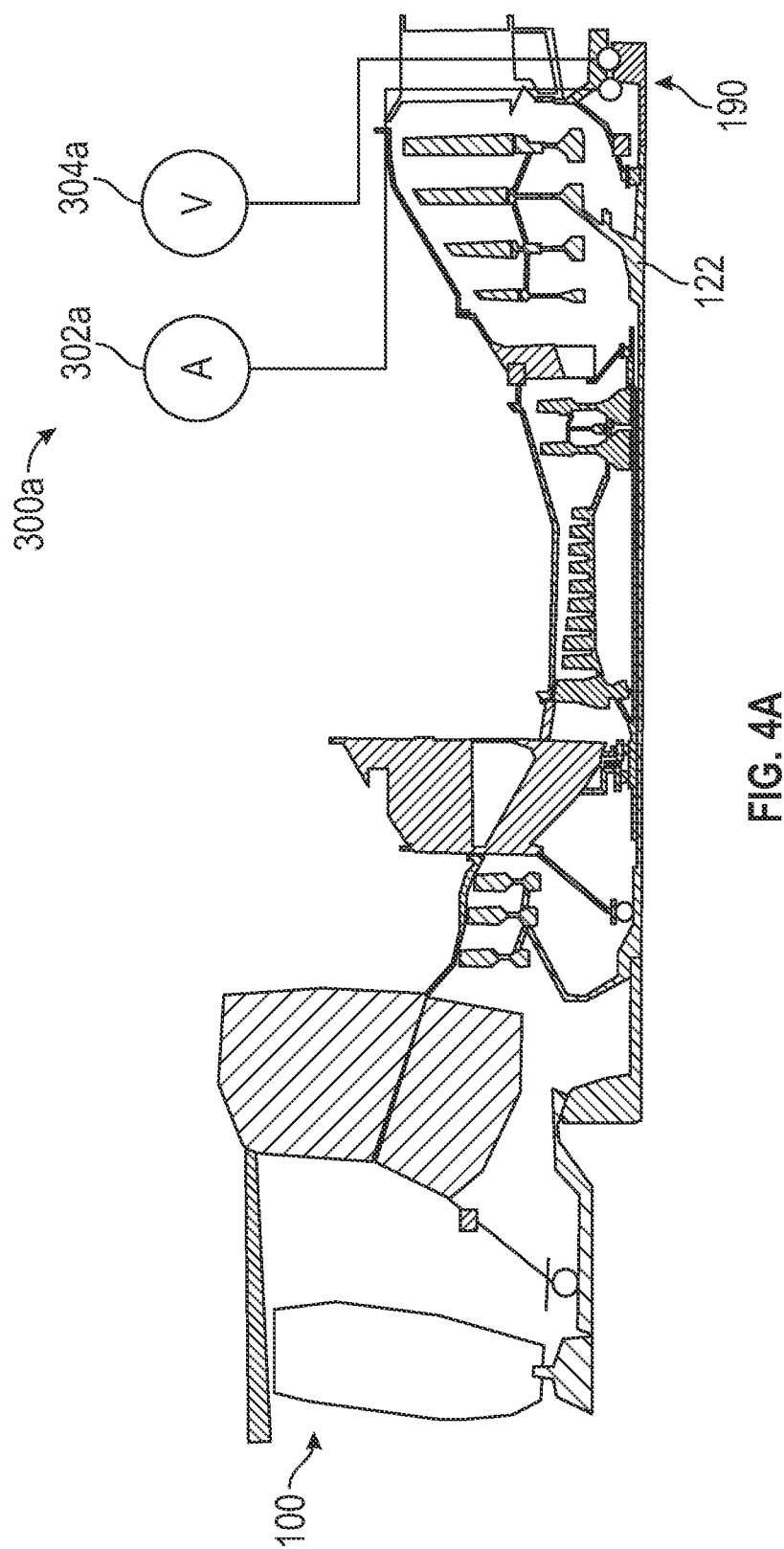
FIG. 4A illustrates a sensor assembly for a gas turbine engine, such as the gas turbine engine described with respect to FIG. 2, according to the present disclosure.

FIG. 4A illustrates an exemplary sensor assembly 300a for monitoring dynamic torque and torsional frequency in the turbine engine 100. The sensor assembly 300a includes an ammeter 302a, or other current measurement device, and a voltage sensor 304a. Although a single ammeter and a single voltage sensor are shown, more of one or both may be provided. The ammeter 302a and the voltage sensor 304a are coupled to an electric machine 190 of the engine 100. The electric machine 190 may be the same as or similar to the electric machine 90 of FIG. 1. The electric machine 190 may be mounted in the same or similar location, e.g., mounted to the low-speed shaft 122 (FIG. 2).

Figure 4B:
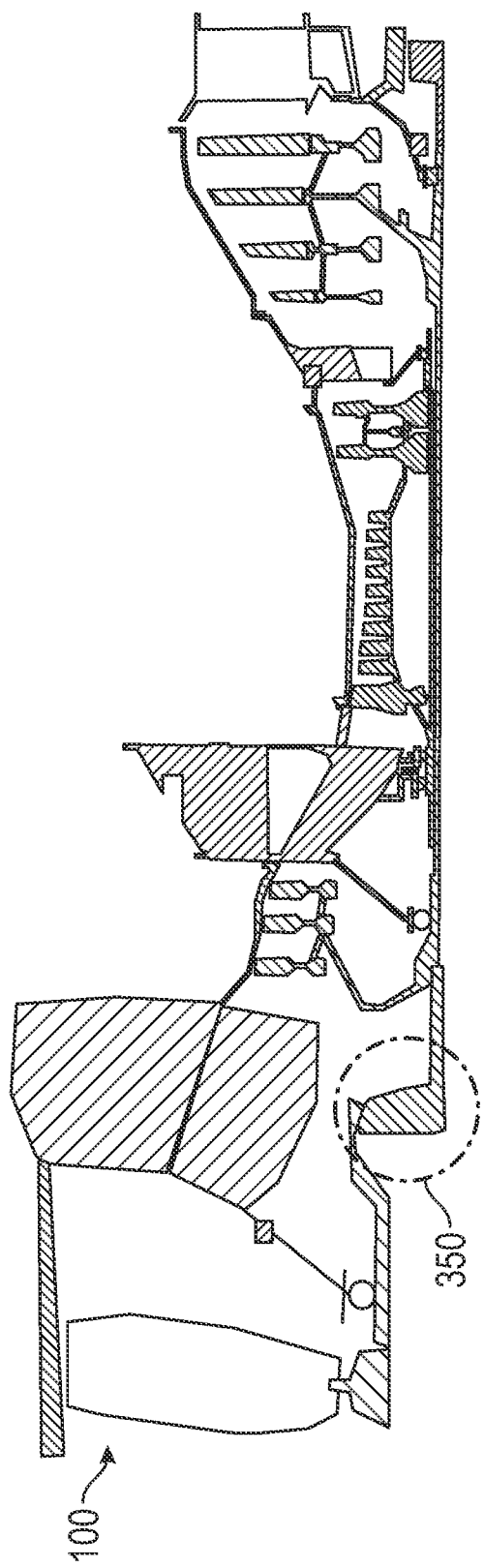
FIG. 4B illustrates a sensor assembly for a gas turbine engine, such as the gas turbine engine described with respect to FIG. 2, according to the present disclosure.
Figure 4C:
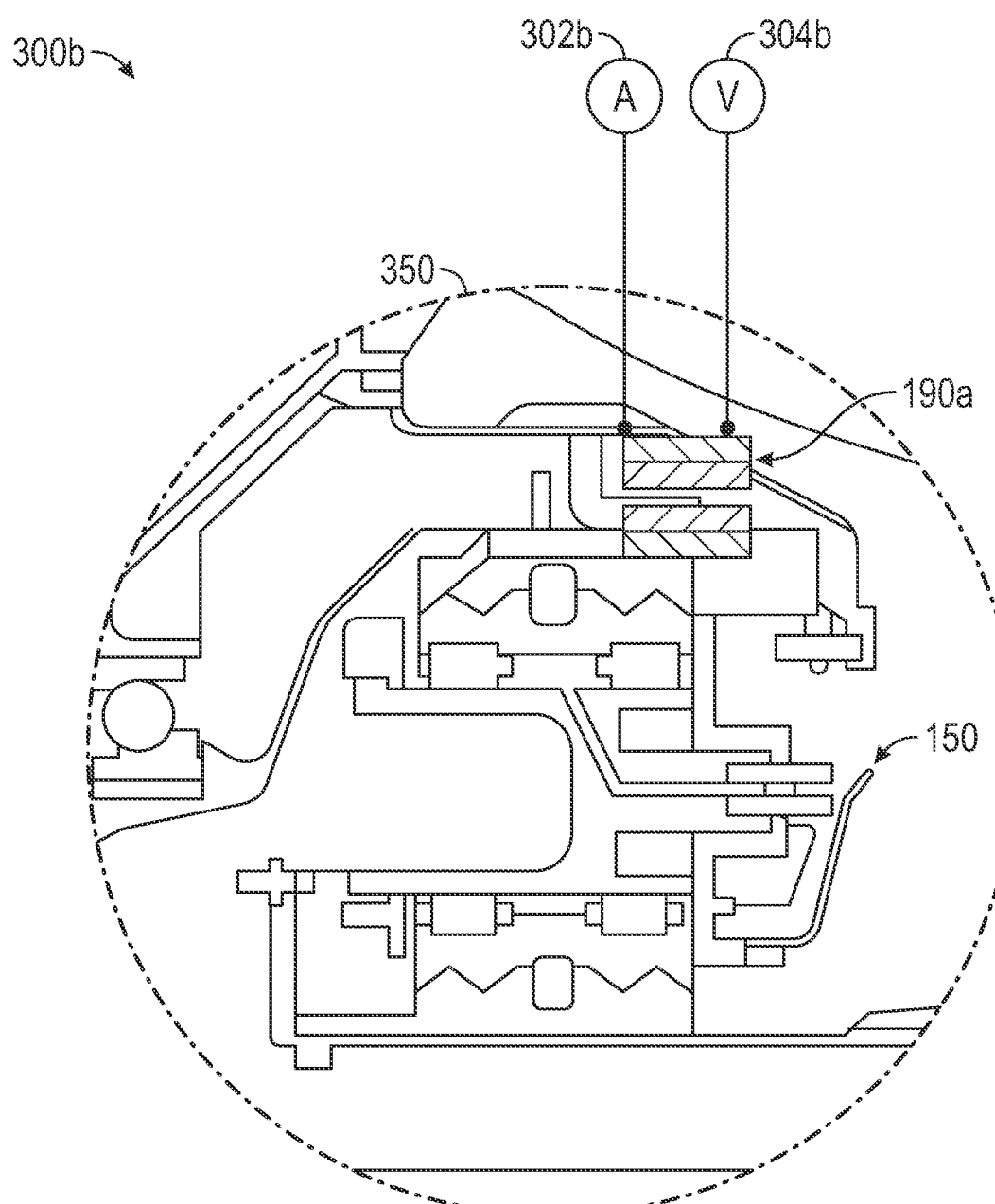
FIG. 4C illustrates an enlarged view of FIG. 4B having a first sensor assembly for a gas turbine engine, such as the gas turbine engine described with respect to FIG. 2, according to the present disclosure.

FIGS. 4B and 4C illustrate an exemplary sensor assembly 300b for monitoring dynamic torque and torsional frequency in the turbine engine 100. FIG. 4C illustrates a detail view 350 of the engine 100 of FIG. 4B. The sensor assembly 300b includes an ammeter 302b, or other current measurement device, and a voltage sensor 304b. Although a single ammeter and a single voltage sensor are shown, more of one or both may be provided. The ammeter 302b and the voltage sensor 304b are coupled to an electric machine 190a of the engine 100. The electric machine 190a may be the same as or similar to the electric machine 90 of FIG. 1. The electric machine 190a may be mounted to the gearbox assembly 150.

Figure 4D:
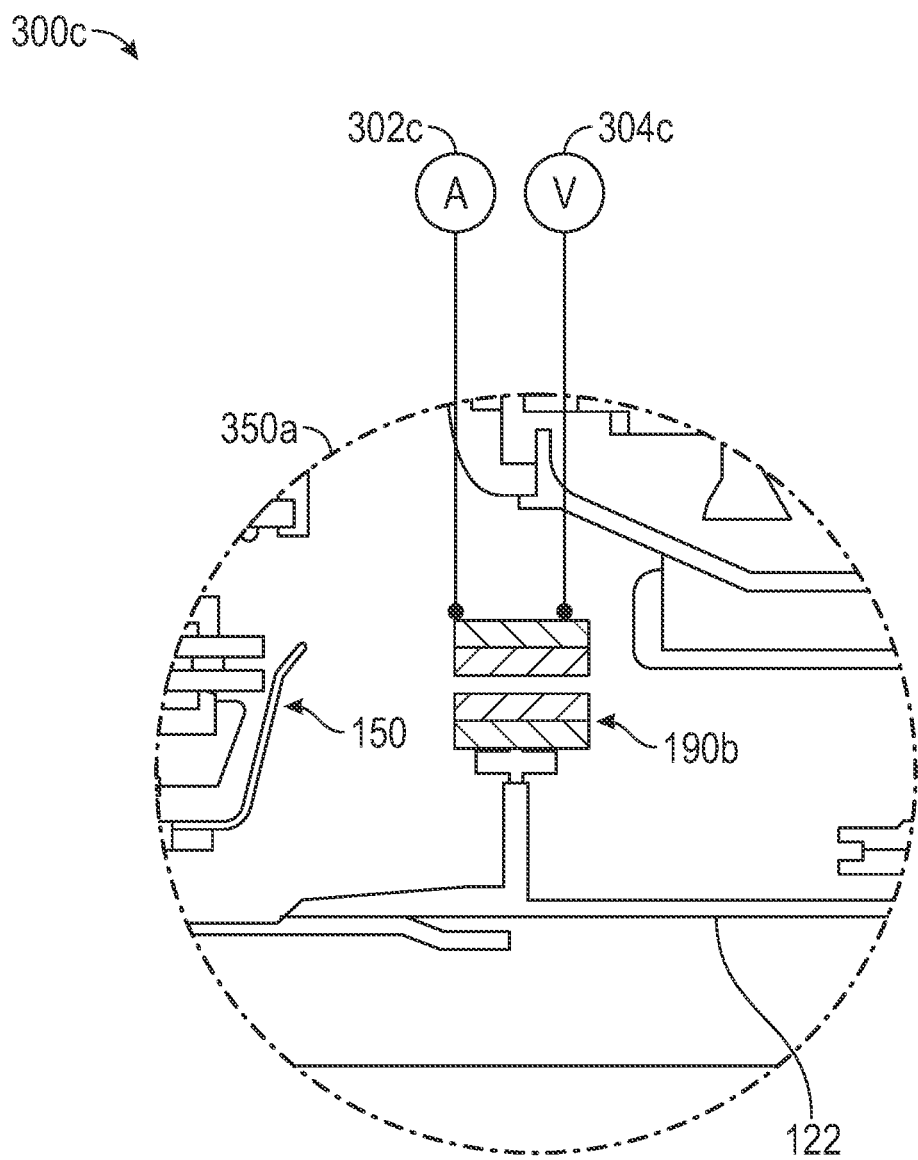
FIG. 4D illustrates an alternative enlarged view of FIG. 4B having a second sensor assembly for a gas turbine engine, such as the gas turbine engine described with respect to FIG. 2, according to the present disclosure.

FIG. 4D illustrates an alternative detail view 350a that may be used in the turbine engine 100 having an exemplary sensor assembly 300c for monitoring dynamic torque and torsional frequency in the turbine engine 100. The sensor assembly 300c includes an ammeter 302c, or other current measurement device, and a voltage sensor 304c. Although a single ammeter and a single voltage sensor are shown, more of one or both may be provided. The ammeter 302c and the voltage sensor 304c are coupled to an electric machine 190b of the engine 100. The electric machine 190b may be the same as or similar to the electric machine 90 of FIG. 1. The electric machine 190b may be mounted to a coupling between the gearbox assembly 150 and the low-speed shaft 122.

The sensor assemblies 300a, 300b, and 300c of FIGS. 4A to 4D may monitor electric machine parameters indicative of torque and torsional frequency in the engine 100. The voltage sensor provides voltage time domain data and/or current time domain data indicative of torsional vibrations in the system. The ammeter provides a signal that is used to cancel noise, if any, from the voltage sensor signal, and is indicative of noise of the electric machine.

Figure 5:
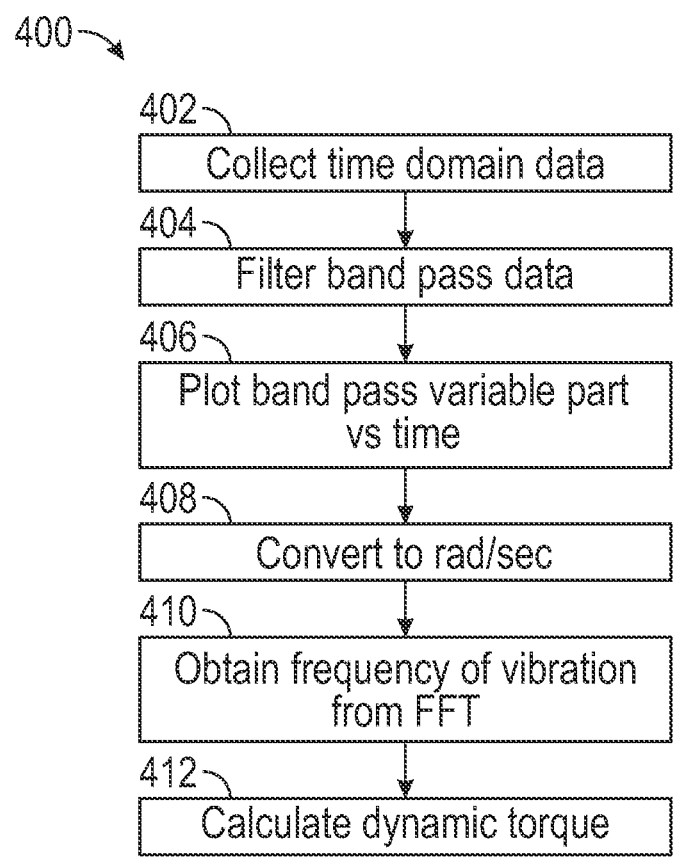
FIG. 5 illustrates a method for calculating dynamic torque, according to the present disclosure.

FIG. 5 illustrates exemplary methods for calculating dynamic torque in the engine 100 (FIG. 2) with any of the sensor assemblies 200a, 200b, 200c, 300a, 300b, or 300c (FIGS. 3A-4D). In the method 400 of FIG. 5, at step 402 time domain data is collected. In the examples including the pressure sensors (e.g., FIGS. 3A to 3C), this data is time domain pressure data and, in the examples, including the voltage sensors, this is time domain voltage data (e.g., FIGS. 4A to 4D). At step 404, the data is filtered with a band pass filter. The band pass filter may be based on a number of phases. At step 406, the portion of the data that has been filtered through the band pass filter is plotted as a function of time. At step 408, the data is converted into rad/sec. In the examples including the pressure sensors (e.g., FIGS. 3A to 3C), the method proceeds to step 410 to calculate a frequency of vibration by conducting a fast Fourier transform on the data, which allows, at step 412, calculation of the dynamic torque. The method may be carried out by a processor.

The method of FIG. 5 allows a torque correlation to modal deflections at the sensor locations. The output of the method of FIG. 5 may include the magnitude of relative twist and the frequency of the dynamic torque and may allow for monitoring limits in the engine to be set based on the various response pickup locations.

FIGS. 6A to 6E illustrate exemplary sensor assemblies for monitoring dynamic torque and torsional frequency in the turbine engine 100. The sensor assemblies of FIGS. 6A to 6E monitor time lag between the sensors to identify torsional displacement indicative of dynamic torque and torsional frequency. The following description includes references back to the turbine engine 100 and, thus, like numbers represent like features of the turbine engine 100. Although illustrated in the turbine engine 100, the sensor assemblies of FIGS. 6A to 6E may be provided in the turbine engine 10, or other turbine engines.

Figure 6A:
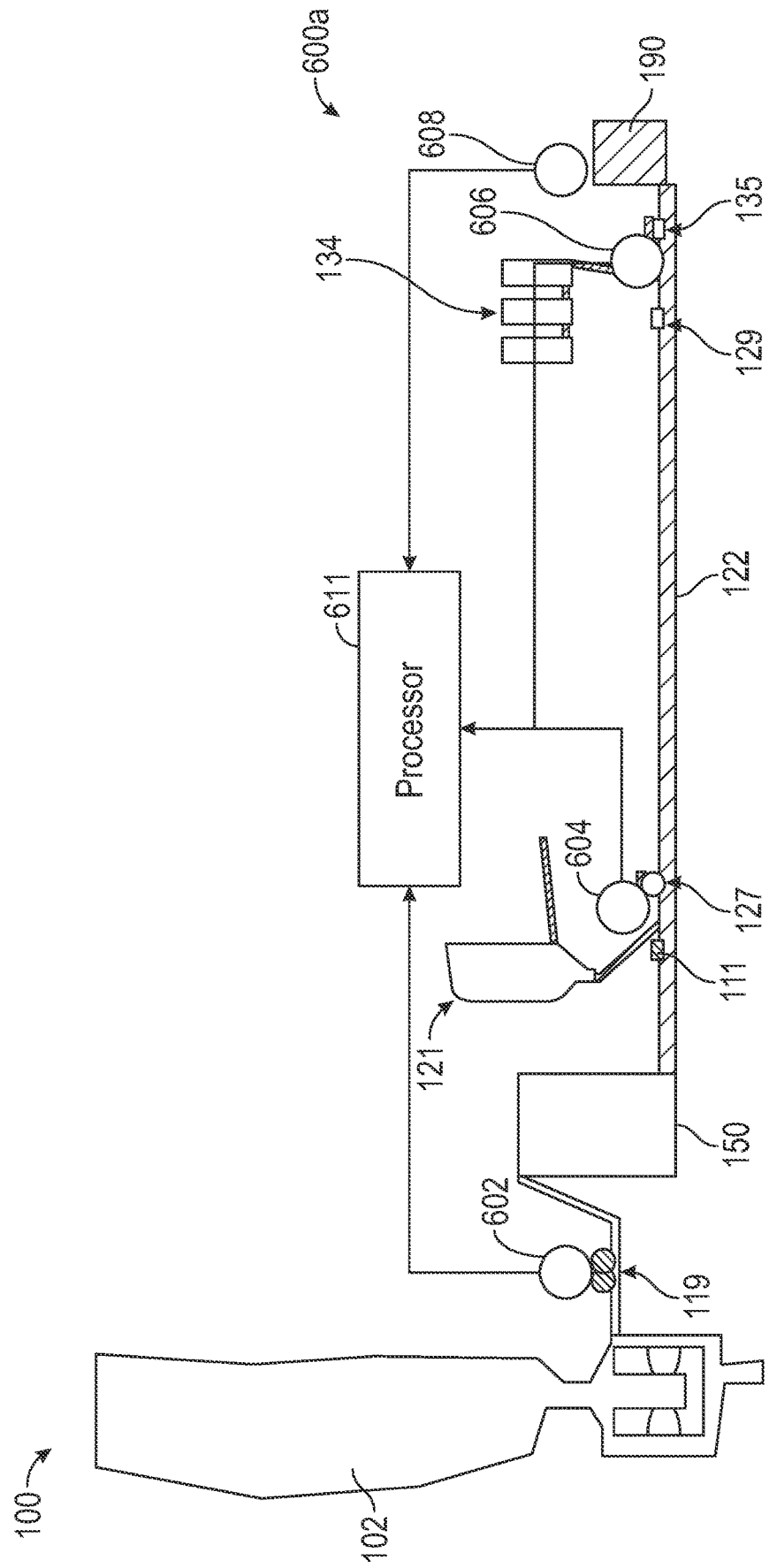
FIG. 6A illustrates a sensor assembly for a gas turbine engine, such as the gas turbine engine described with respect to FIG. 2, according to the present disclosure.

FIG. 6A illustrates an exemplary sensor assembly 600a. The sensor assembly 600a includes a first magnetic sensor 602, a second magnetic sensor 604, a third magnetic sensor 606, and a fourth magnetic sensor 608. Although four magnetic sensors are depicted and described, more or fewer may be provided. A minimum of two magnetic sensors, however, is required in order to determine the time lag, as described in more detail to follow. The first magnetic sensor 602 is located at the forward bearing assembly 119 on the fan shaft of the fan 102. The second magnetic sensor 604 is located between a forward bearing assembly 111 forward of the low-pressure compressor 121 and an aft bearing assembly 127 aft of the low-pressure compressor 121. The third magnetic sensor 606 is located between a first bearing assembly 129 forward of the high pressure turbine 134 and a second bearing assembly 135 aft of the high pressure turbine 134. The fourth magnetic sensor 608 is located at the electric machine 190. The magnetic sensors 602, 604, 606, 608 are coupled to a processor 611 configured to process the real-time data gathered by the magnetic sensors.

Each of the magnetic sensors 602, 604, 606, 608 is located at substantially the same radial location with respect to the longitudinal centerline axis 112 (FIG. 2), but is axially spaced along the length of a fan shaft 157 and the low-speed shaft 122. A magnetic material or a magnetic indicator is placed on the rotating shaft (e.g., the fan shaft 157 or the low-speed shaft 122) at each sensor location. As the magnetic material passes the respective sensor (e.g., by way of the rotation of the rotating shaft), the sensor generates a signal or a pulse indicative of one revolution of the rotating shaft. The processor 611 may process the signals and identify a time lag between the axially spaced magnetic sensors 602, 604, 606, 608, which is indicative of the rotor torsional modes. To identify the time lag, the signals are compared to a predefined reference time based on rotor speeds or similar data.

FIGS. 6B and 6C illustrate an exemplary sensor assembly 600b. The sensor assembly 600b includes a first magnetic sensor 610 and a second magnetic sensor 612. The first magnetic sensor 610 is located at an outer diameter DEM of electric machine 190. The outer diameter DEM of the electric machine 190 may include a plurality of first magnetic protrusions 614. The second magnetic sensor 612 is located at an outer diameter DGB of the gearbox assembly 150. The outer diameter DGB of the gearbox assembly 150 may include a plurality of second magnetic protrusions 616. The first magnetic sensor 610 and the second magnetic sensor 612 are coupled to a processor 618 configured to process the data gathered by the magnetic sensors. Although two magnetic sensors are illustrated and described, more or fewer may be provided.

In the sensor assembly 600b, the magnetic sensors 610, 612 may be magnetic induction sensors. The sensor assembly 600b monitors and calculates the most extreme tangential displacement that may be created on the gearbox assembly 150 and electric machine 190. The magnetic protrusions 614, 616 may create dips and humps (e.g., similar to a gear tooth) on the gearbox housing (e.g., the plurality of second magnetic protrusions 616) and on the electric generator housing (e.g., the plurality of first magnetic protrusions 614). The first magnetic sensor 610 detects a differential magnetic flux for the passage of each dip and hump on the gearbox housing and the second magnetic sensor 612 detects a differential magnetic flux for passage of each dip and hump on the electric machine housing. The relative sensor deflections created by the passage of the dips and humps of the protrusions identify magnitudes beyond nominal tangential deflection of the gearbox assembly 150 and electric machine 190, which indicates torsional vibrations. The processor 618 calculates a relative clocking of the gearbox assembly 150 and electric machine 190 for a predefined time duration sample to identify the acceptable torsional magnitude present in the engine 100. The processor 618 identifies a sudden increase in change in magnitude for a time duration sample to indicate presence of torsional vibration.

FIGS. 6D and 6E illustrate an exemplary sensor assembly 600c. The sensor assembly 600c includes a first light probe 620 and a second light probe 622. The first light probe 620 is located at a first bearing assembly 139 of the gearbox assembly 150. The first bearing assembly 139 includes a plurality of bearings, such as a first bearing 139a and a second bearing 139b. The second light probe 622 is located at the second bearing assembly 135 forward of the electric machine 190. The second bearing assembly 135 includes a plurality of bearings, such as a first bearing 135a and a second bearing 135b. The first light probe 620 and the second light probe 622 are coupled to a processor 624 configured to process the data gathered by the probes. Although two light probes are illustrated and described, more or fewer may be provided.

The sensor assembly 600c leverages the principle of blade tip timing to produce a system that indicates torsional vibration. The sensor assembly 600c measures passing events for each bearing of the bearing assemblies 139, 135 at a specific angular location. The sensor assembly 600c includes a light source or a laser source, a photodetector/amplifier, and a light probe (e.g., the first light probe 620 and the second light probe 622). In some examples, the light probes may be installed to illuminate the roller bearings or ball bearings (e.g., the bearings of the bearing assembly 139 and 135) and to capture light reflections as the bearings pass in proximity to the light probe. In some examples, the light probes may be pitch-catch probes that are installed in a manner that relies on the bearing chopping a light signal as the bearing pass between the pitch-catch probes. The differential measurements of rate of bearing passing between the ball bearings at the forward bearing assembly 139 and the roller bearings at the aft bearing assembly 135 provides an indication of torsion in the low-speed shaft 122.

The sensor assemblies of FIGS. 6A to 6C include magnetic pickups to detect a time lag from one sensor location to another. That is, at each sensor location, a magnetic material (e.g., magnetic protrusion, strip, etc.) is detected by the sensor. The sensor assembly 600c of FIGS. 6D and 6E includes light probes to detect a time lag from one sensor location to another. Each sensor of the aforementioned embodiments are placed at the same radial location. With no torsional displacement, the time that a respective sensor passes the magnetic material or generates the light signal should be the same across the rotating shaft (e.g., the low-speed shaft 122 and/or the fan shaft 157). The sensors of the sensor assemblies of FIGS. 6A to 6E detect a time lag between the sensors placed along the axial length of the engine. The time lag is indicative of torsional displacement, which is indicative of dynamic torque and torsional frequency of the engine 100.

Figure 7:
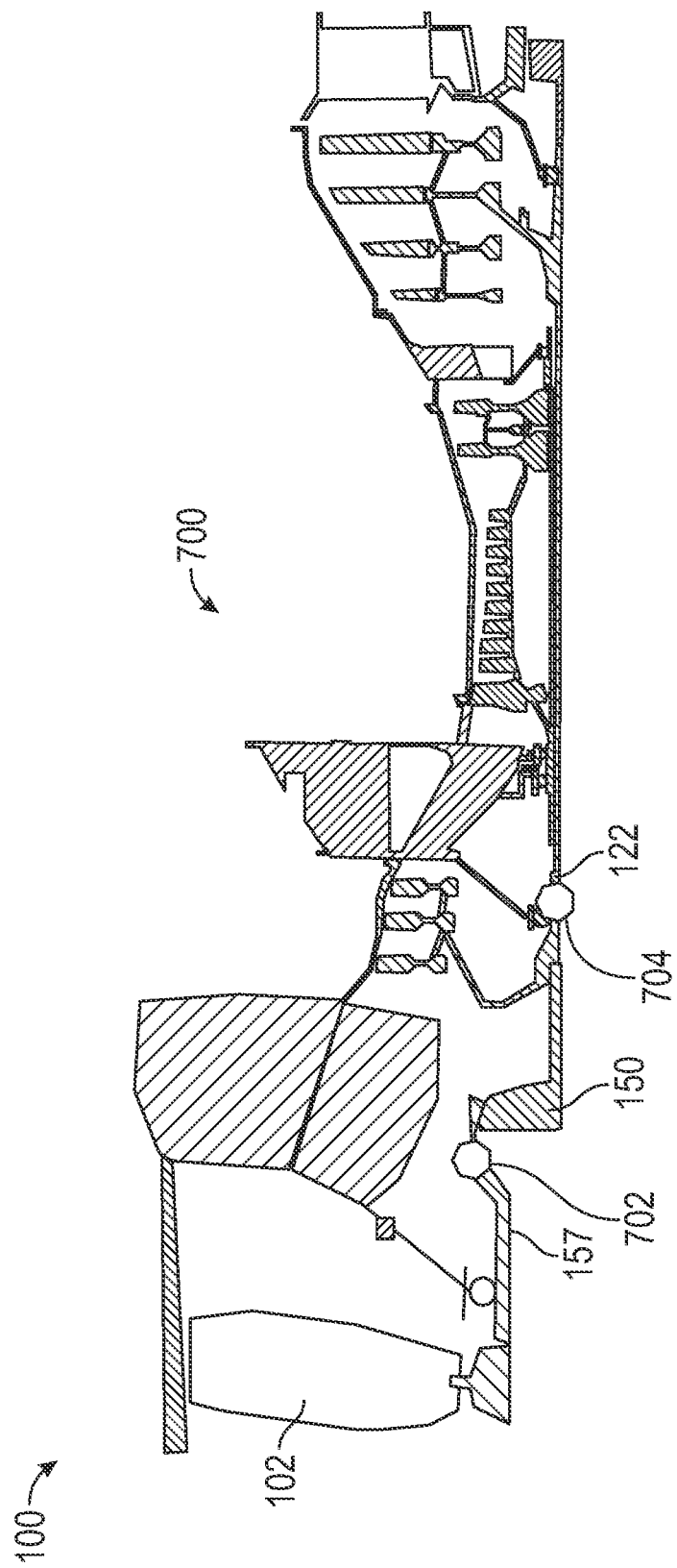
FIG. 7 illustrates a sensor assembly for a gas turbine engine, such as the gas turbine engine described with respect to FIG. 2, according to the present disclosure.

FIG. 7 illustrates an exemplary sensor assembly 700 for monitoring dynamic torque and torsional frequency in the turbine engine 100. The following description includes references back to the turbine engine 100 and, thus, like numbers represent like features of the turbine engine 100. Although illustrated in the turbine engine 100 (FIG. 2), the sensor assembly of FIG. 7 may be provided in the turbine engine 10 (FIG. 1), or other turbine engines. The sensor assembly 700 includes a first incremental rotary encoder 702 and a second incremental rotary encoder 704. Although two incremental rotary encoders are depicted and described, more or fewer may be provided. The first incremental rotary encoder 702 is located on the fan shaft 157 coupling the fan 102 to the low-speed shaft 122. The second incremental rotary encoder 704 is located on the low-speed shaft 122.

The sensor assembly 700 requires a minimum of one incremental rotary encoder mounted on the low-speed shaft (e.g., the second incremental rotary encoder 704). Angular displacement data in time domain is gathered by the incremental rotary encoder to indicate torsional vibration of the system. Additional incremental rotary encoders may be mounted on the input shaft of the gearbox assembly (e.g., the first incremental rotary encoder 702) to understand the transmission error (e.g., the change in angular displacements between the input shaft of the gearbox assembly 150, e.g., the low-speed shaft. 122 and the output shaft of the gearbox assembly 150, e.g., the fan shaft 157), which is the cause of torsional vibration in the system.

Figure 8:
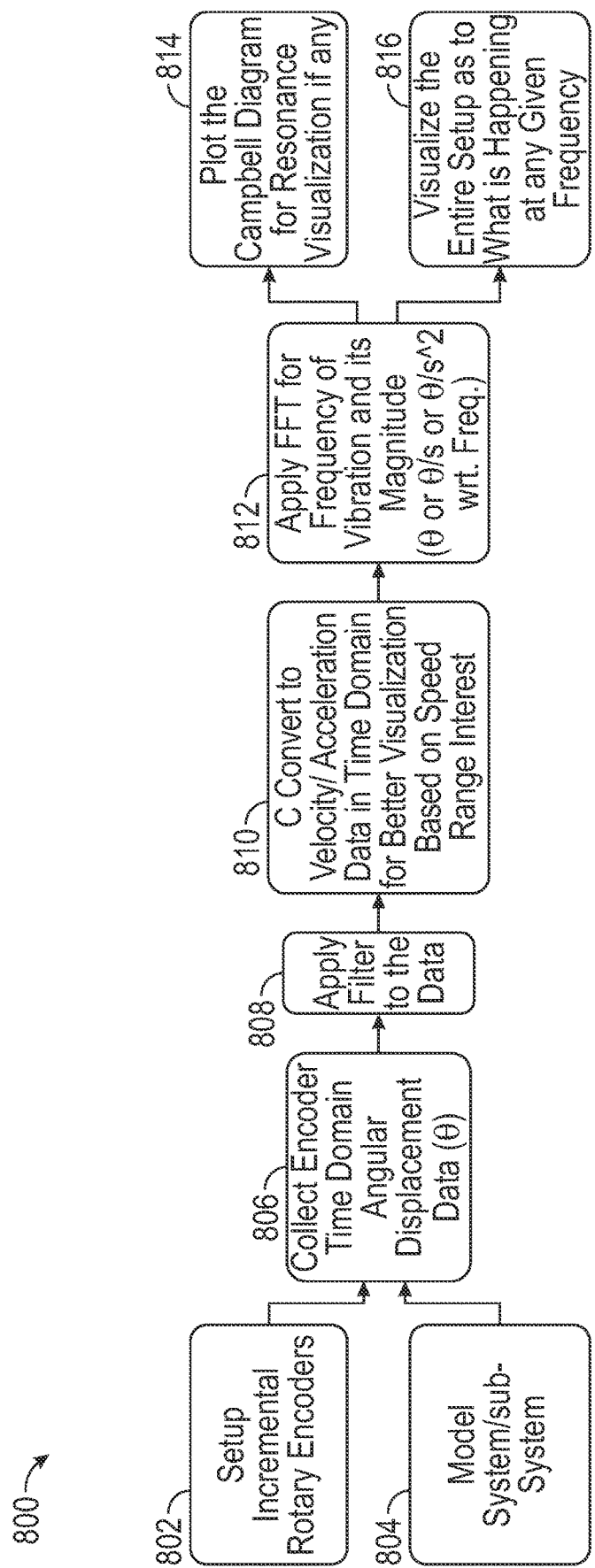
FIG. 8 illustrates a method of calculating dynamic torque with the sensor assembly of FIG. 7, according to the present disclosure.

FIG. 8 illustrates a method 800 of monitoring dynamic torque and torsional frequency including the sensor assembly 700 of FIG. 7 or the sensor assemblies 600a, 600b, 600c of FIGS. 6A to 6E. At step 802, the method includes setting up the incremental rotary encoders described with respect to FIG. 7 (or magnetic sensors or optical sensors, as described with respect to FIGS. 6A to 6E) on the engine 100 and, at step 804, modeling the system. At step 806, the encoder time domain data is collected with the sensor assembly 700. At step 808, the data is filtered and, at step 810, the data is converted to enhance visualization and, at step 812, the method 800 conducts a fast Fourier transform on the data, which allows, at step 814 and step 816, visualization, plotting, and calculation of the dynamic torque. The method may be carried out by a processor. The method of FIG. 8 may be employed on model engines or virtual models to indicate dynamic torque in the engine. Multiple sensors may be introduced on stationary and rotary components in the virtual model. Angular displacement at all response frequencies along with the resonance frequency may be simulated with the virtual model and, thus, the torsional vibration can be calculated at any frequency.

FIGS. 9 to 11B illustrate exemplary sensor assemblies for monitoring dynamic torque and torsional frequency in the turbine engine 100 (FIG. 2). The following description includes references back to the turbine engine 100 and, thus, like numbers represent like features of the turbine engine 100. Although illustrated in the turbine engine 100, the sensor assemblies of FIGS. 9 to 11B may be provided in the turbine engine 10 (FIG. 1), or other turbine engines.

Figure 9:
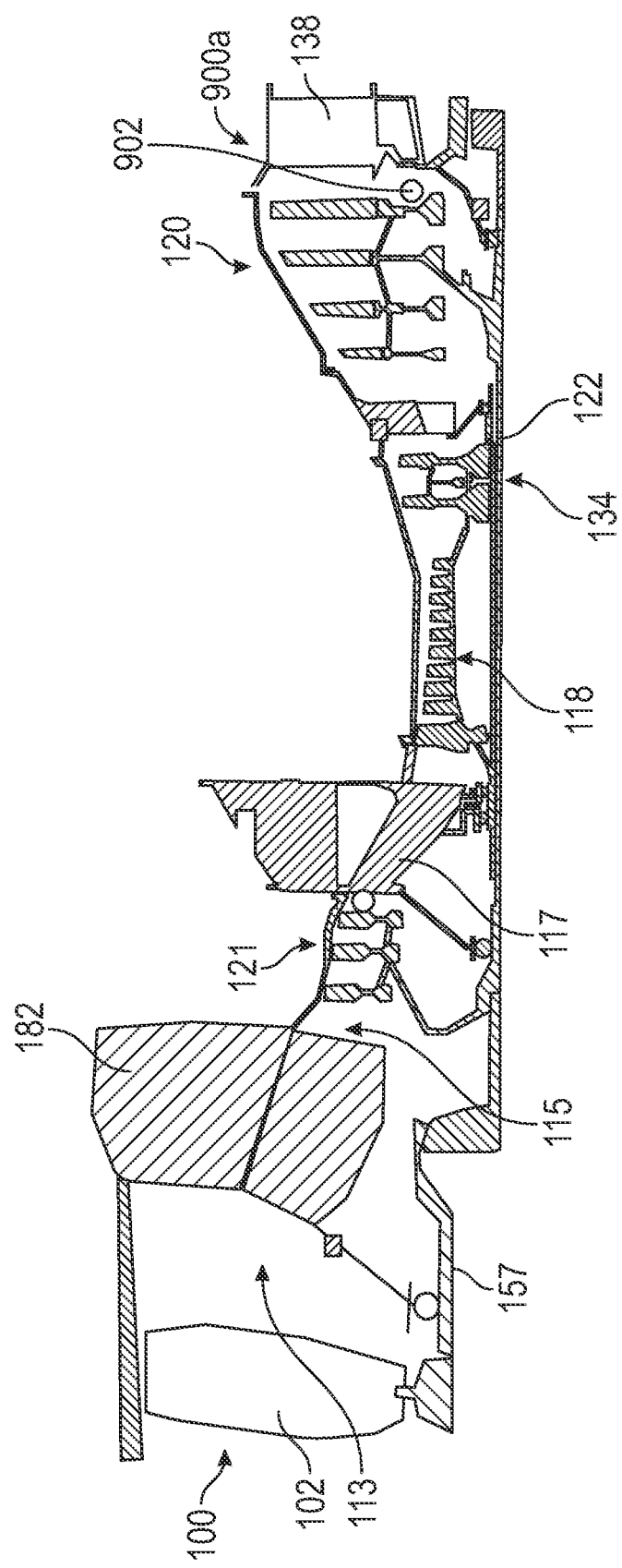
FIG. 9 illustrates a sensor assembly for a gas turbine engine, such as the gas turbine engine described with respect to FIG. 2, according to the present disclosure.

FIG. 9 illustrates an exemplary sensor assembly 900a. The sensor assembly 900a includes an optical sensor 902 mounted at a target or a strategic location. For example, the target location as shown in FIG. 9 is on the downstream most stage of the low-pressure turbine 120. Other strategic or target locations are contemplated. Although a single optical sensor 902 is shown, more may be provided. In one example, the optical sensor 902 may be located on the stator frame downstream of the last stage of the low-pressure turbine 120. In another example, the optical sensor 902 may be located on the housing extending radially inward from the frame to have the rotating bolts of the low-pressure turbine in view (e.g., the bolts visible in FIG. 12). In another example, the optical sensor 902 may be located upstream of the first stage of the low-pressure turbine 120 on the frame forward of the low-pressure turbine 120, referred to as the turbine center frame. In such a location, the optical sensor 902 may pick up the torsional functions of the bolt head of FIG. 12. In another example, the optical sensor 902 may be in the forward section of the engine, for example, near the booster or compressor stages and mounted to the frame 117 (FIG. 3A) to measure similar rotating bolts as to the those discussed above with respect to the low-pressure turbine 120. In some examples, the optical sensor 902 may be located on a stator of the gearbox assembly 150.

Figure 10:
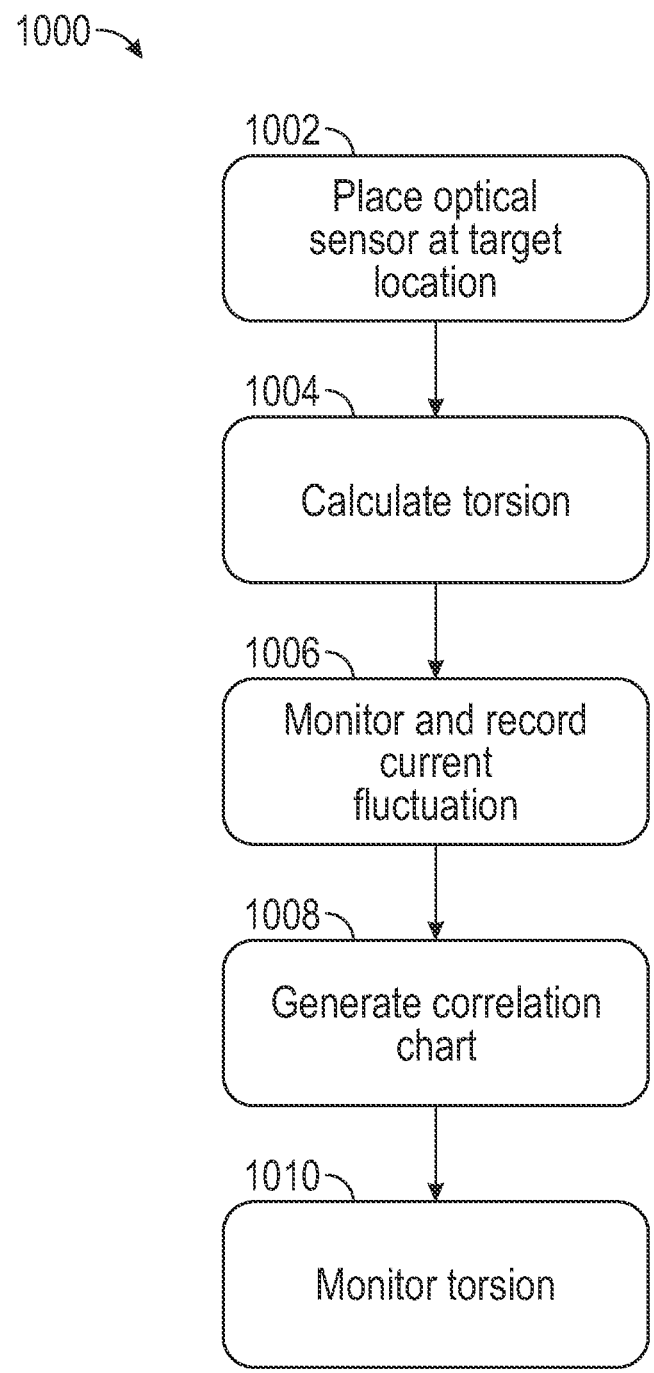
FIG. 10 illustrates a method of calculating dynamic torque with the sensor assembly of FIG. 9, according to the present disclosure.
Figure 11:
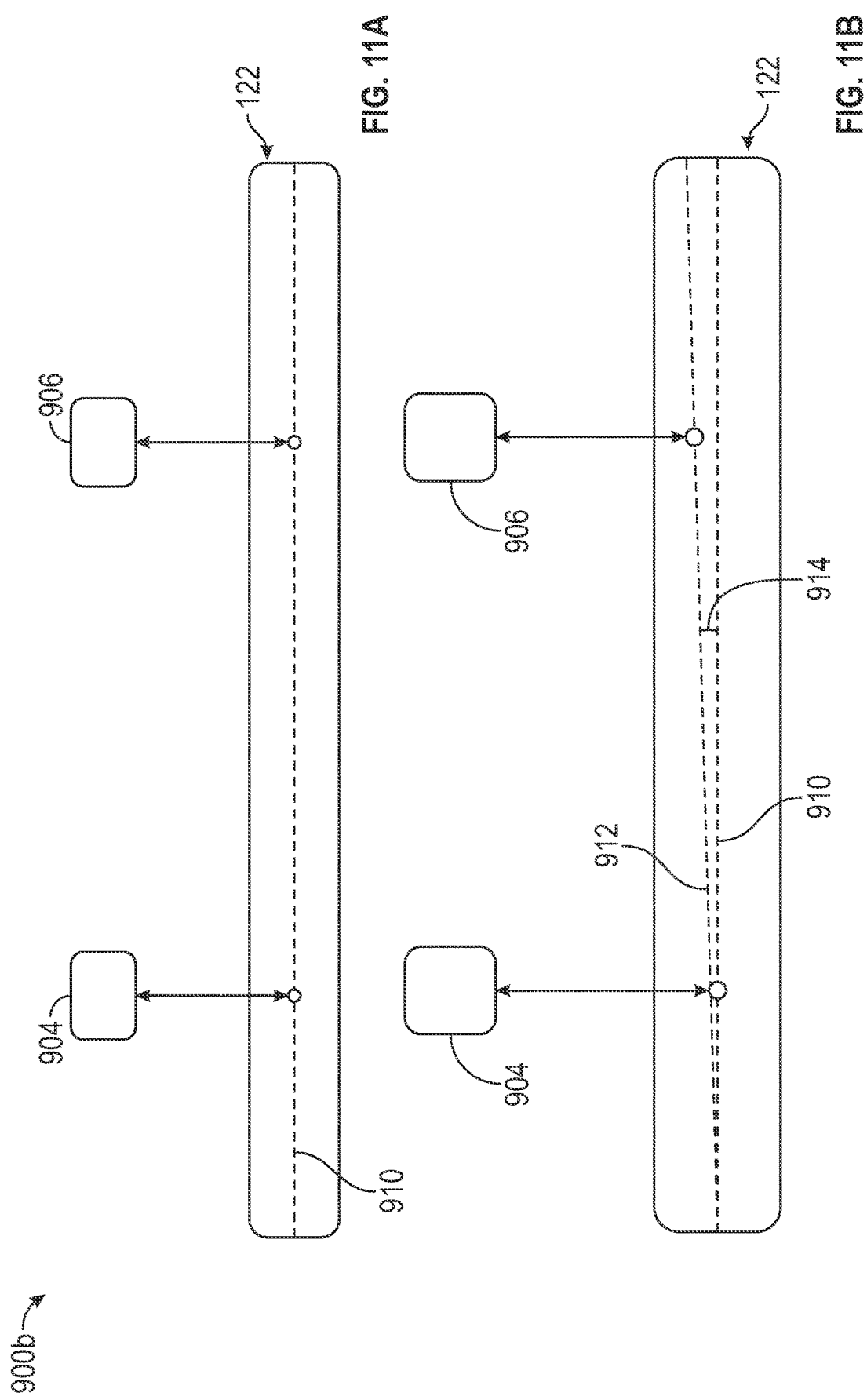
FIG. 11A illustrates a schematic view of a sensor assembly and a shaft having no torsional displacement, according to the present disclosure.
FIG. 11B illustrates a schematic view of the sensor assembly of FIG. 11A and a shaft having torsional displacement, according to the present disclosure.

FIG. 10 illustrates a method 1000 of employing the sensor assembly 900a. At step 1002, the optical sensors are placed at the target locations. At step 1004, based on the data from the optical sensors, the torsional fluctuation is calculated. At step 1006, the current fluctuation in the electric machine 190 (FIG. 2) is monitored and recorded. At step 1008, a correlation chart is generated between the torsional fluctuation (e.g., data from step 1004) and the current fluctuation (e.g., data from step 1006). Step 1010 allows for monitoring of the torsion in the rotor (e.g., the low-speed shaft 122 of FIG. 2).

In the sensor assembly 900a (FIG. 9), the optical sensor 902 (FIG. 9) detects a tape or a patch provided on the rotary component at the target location. Based on the rotor speed and timing of the blip caused by passage of the tape or the patch, torsional fluctuation can be calculated. The sensor assembly 900a may also record current fluctuation in the electric machine and a correlation chart may be generated between torsion in the rotor (as sensed by the optical sensor 902) and the current fluctuation in the electric machine. Torsion in the rotor of the fielded engine can then be monitored using the correlation chart.

FIGS. 11A and 11B illustrate an exemplary sensor assembly 900b. The sensor assembly 900b may be the same as or similar to the sensor assembly 900a (FIG. 9), with the addition of a second optical sensor. That is, the sensor assembly 900b includes a first optical sensor 904 and a second optical sensor 906. The optical sensors 904 and 906 are spaced apart on the low-speed shaft 122. For example, the first optical sensor 904 may be located at a forward end of the low-speed shaft 122 and the second optical sensor 906 may be located at an aft end of the low-speed shaft 122. The first optical sensor 904 and the second optical sensor 906 may be located at the same radial location with respect to the low-speed shaft 122. FIGS. 11A and 11B illustrate how the optical sensors allow for monitoring of torsion in the low-speed shaft. In FIG. 11A when no torsion in the low-speed shaft occurs, the first optical sensor 904 and the second optical sensor 906 will both monitor locations on a longitudinal axis 910 of the low-speed shaft 122. If torsion exists, as shown in FIG. 11B, the torsion will cause the first optical sensor 904 and the second optical sensor 906 to monitor locations at different longitudinal lines of the low-speed shaft 122. For example, the second optical sensor 906 may continue to monitor a location on the longitudinal axis 910, while the first optical sensor 904 may monitor a location that is radially offset from that on another longitudinal axis 912. This is due to the twist in the low-speed shaft 122. An angle 914 between the longitudinal axes 910 and 912 may be correlated to a torsion in the low-speed shaft 122.

FIGS. 12 to 14B illustrate exemplary sensor assemblies for monitoring dynamic torque and torsional frequency in the turbine engine 100 (FIG. 2). The following description includes references back to the turbine engine 100 and, thus, like numbers represent like features of the turbine engine 100. Although illustrated in the turbine engine 100, the sensor assemblies of FIGS. 12 to 14B may be provided in the turbine engine 10 (FIG. 1), or other turbine engines.

Figure 12:
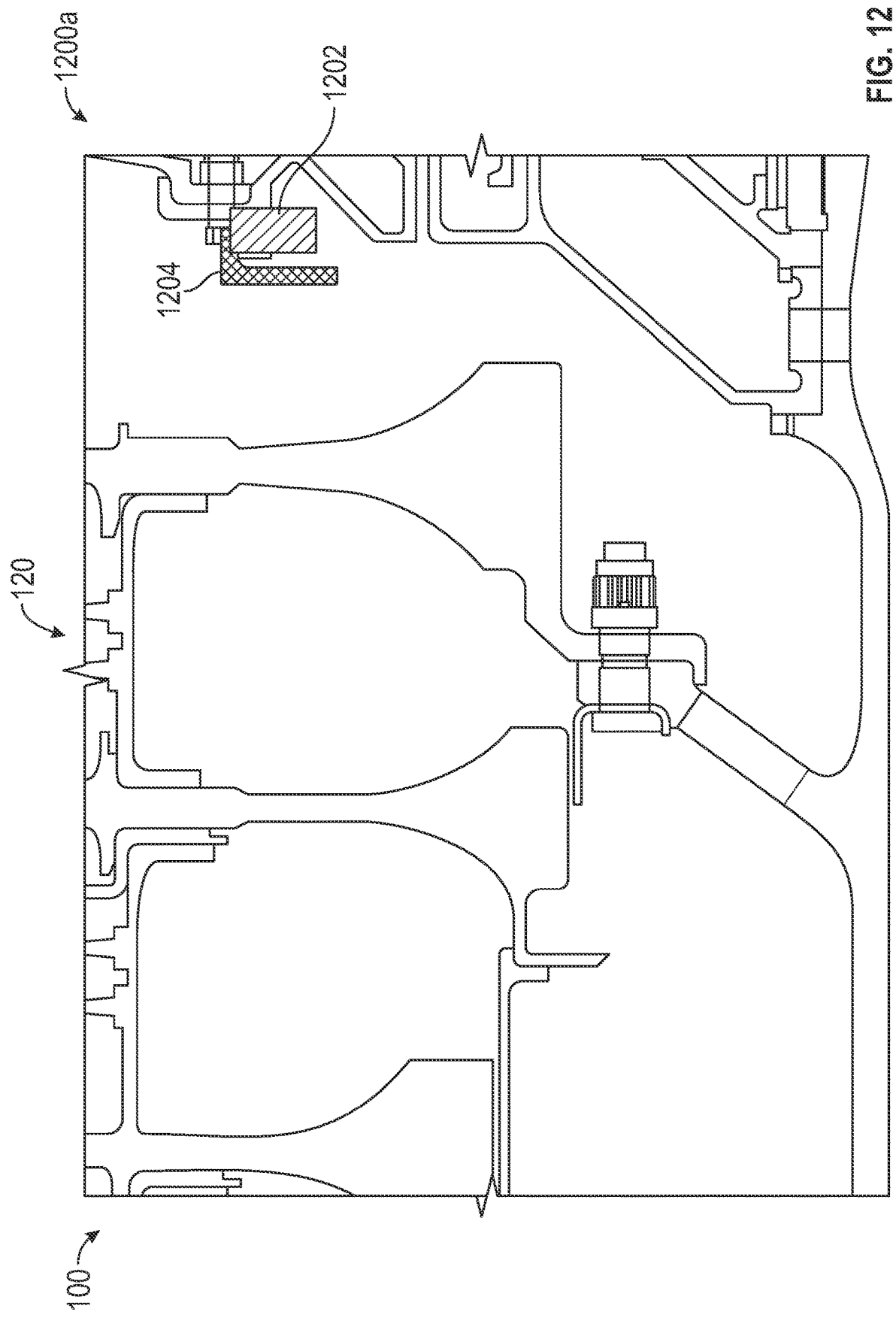
FIG. 12 illustrates a sensor assembly for a gas turbine engine, such as the gas turbine engine described with respect to FIG. 2, according to the present disclosure.
Figure 13:
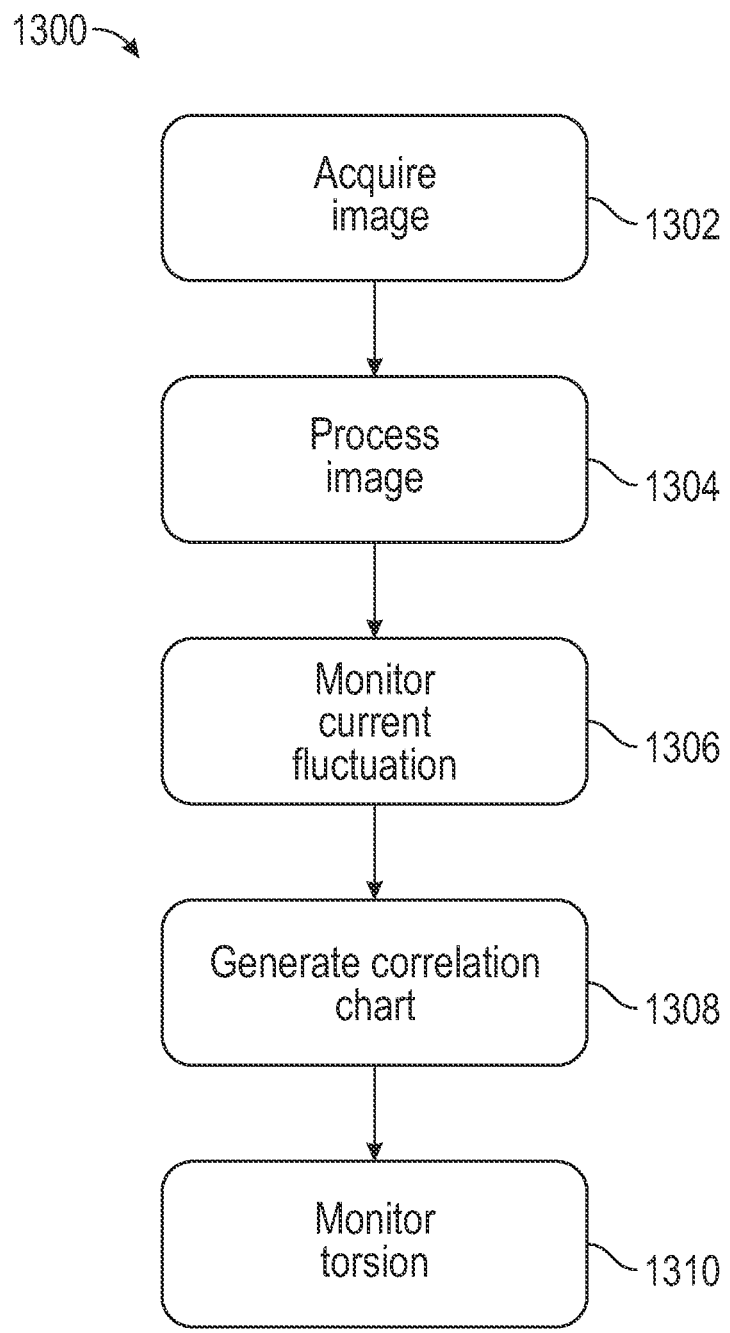
FIG. 13 illustrates a method of calculating dynamic torque with the sensor assembly of FIG. 12, according to the present disclosure.

FIG. 12 illustrates an exemplary sensor assembly 1200a. The sensor assembly 1200a includes a high speed camera 1202 mounted at a target or a strategic location. For example, the target location as shown in FIG. 12 is on the downstream most stage of the low-pressure turbine 120. Other strategic or target locations are contemplated. For example, the high speed camera 1202 may be located on the frame downstream of the low-pressure turbine 120, the frame upstream of the low-pressure turbine 120, or any of the locations described with respect to optical sensor 902 (FIG. 9). As with the optical sensor 902, the high speed camera 1202 must be mounted to a static (e.g., non-rotating) component of the engine. Although only one high speed camera 1202 is shown, more may be provided. A screen 1204 may be included in front of the high speed camera 1202 to protect the high speed camera 1202. FIG. 13 illustrates a method 1300 of employing the sensor assembly 1200a. At step 1302, the high speed cameras acquire an image. At step 1304, the image is processed to generate an indication of the torsional fluctuation. At step 1306, the current fluctuation in the electric machine 190 (FIG. 2) is monitored and recorded. At step 1308, a correlation chart is generated between the torsional fluctuation (e.g., data from step 1304) and the current fluctuation (e.g., data from step 1306). Step 1310 allows for monitoring of the torsion in the rotor (e.g., the low-speed shaft 122 of FIG. 2).

In the sensor assembly 1200a, the high speed camera 1202 detects a color coded image provided on the rotary component at the target location. Based on the rotor speed and timing of the blip caused by passage of the tape or the patch, torsional fluctuation can be calculated. The sensor assembly 1200a may also record current fluctuation in the electric machine and a correlation chart may be generated between torsion in the rotor (as sensed by the high speed camera 1202) and the current fluctuation in the electric machine. Torsion in the rotor of the fielded engine can then be monitored using the correlation chart. The high speed camera 1202 allows for high speed camera imaging combined with image processing for torsional measurement.

Figure 14A:
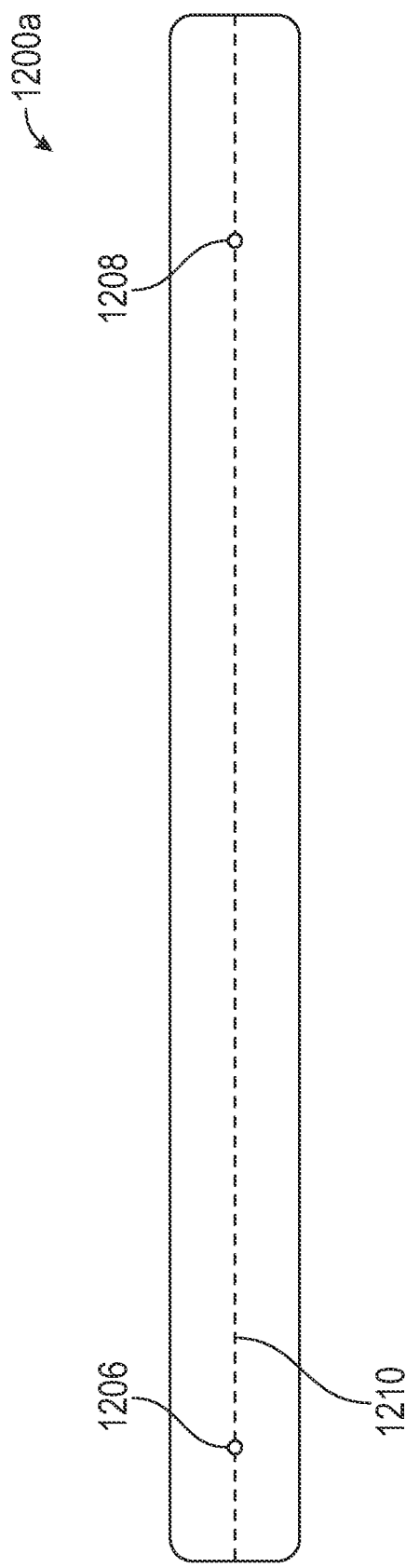
FIG. 14A illustrates a schematic view of a sensor assembly and a shaft having no torsional displacement, according to the present disclosure.
Figure 14B:
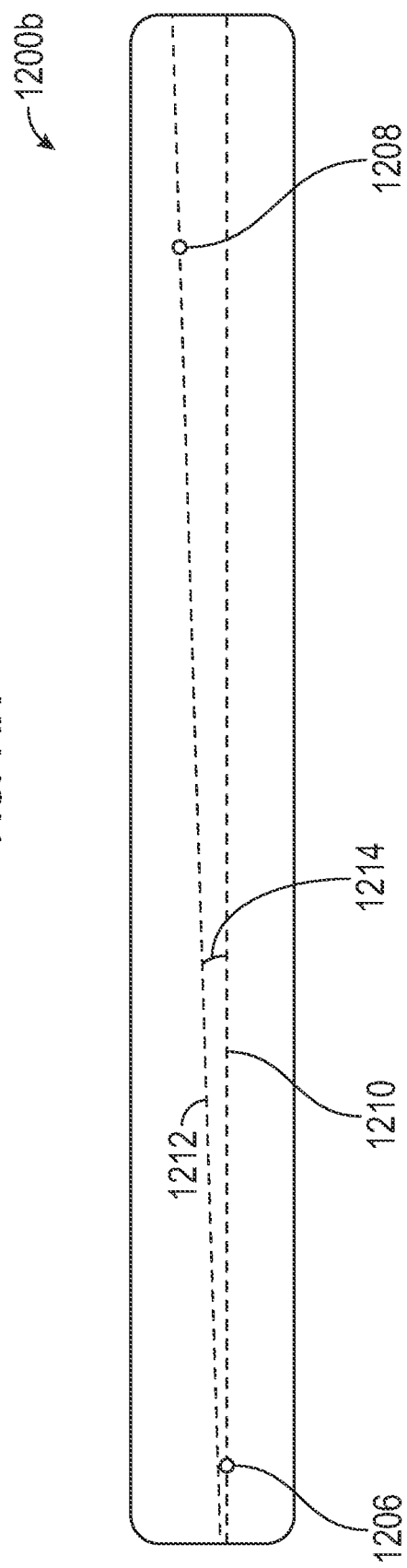
FIG. 14B illustrates a schematic view of the sensor assembly of FIG. 14A and a shaft having torsional displacement, according to the present disclosure.

FIGS. 14A and 14B illustrate an exemplary sensor assembly 1200b. The sensor assembly 1200b may be the same as or similar to the sensor assembly 1200a, with the addition of a second high speed camera. That is, the sensor assembly 1200b includes a first high speed camera 1206 and a second high speed camera 1208. The optical sensors are spaced apart on the low-speed shaft 122. For example, the first high speed camera 1206 may be located at a forward end of the low-speed shaft 122 and the second high speed camera 1208 may be located at an aft end of the low-speed shaft 122. The first high speed camera 1206 and the second high speed camera 1208 may be located at the same radial location with respect to the low-speed shaft 122. FIGS. 14A and 14B illustrate how the high speed cameras allow for monitoring of torsion in the low-speed shaft. In FIG. 14A, when no torsion in the low-speed shaft occurs, the first high speed camera 1206 and the second high speed camera 1208 will both monitor locations on a longitudinal axis 1210 of the low-speed shaft 122. If torsion exists, as shown in FIG. 14B, the torsion will cause the first high speed camera 1206 and the second high speed camera 1208 to monitor locations at different longitudinal lines of the low-speed shaft 122. For example, the first high speed camera 1206 may continue to monitor a location on the longitudinal axis 1210, while the second high speed camera 1208 may monitor a location that is radially offset from that on another longitudinal axis 1212. This is due to the twist in the low-speed shaft 122. An angle 1214 between the longitudinal axes 1210 and 1212 may be correlated to torsion in the low-speed shaft 122.

Any of the aforementioned sensor assemblies, in part or in whole, may be used alone or in combination with other sensor assemblies, in part or in whole, described herein.

Thus, each of the aforementioned sensor assemblies provides systems to monitor and to detect parameters that indicate torsional vibrations in the engine. Once torsional vibration in the low-speed shaft is detected, an action may be taken to dampen the vibration. The actions may provide mechanical dampening (e.g., clutches or torsional damper) or electrical dampening (e.g., varying electrical load). The damping may lessen the vibrations in the low-speed shaft 122 or may eliminate the vibrations in the low-speed shaft 122.

Figure 15:
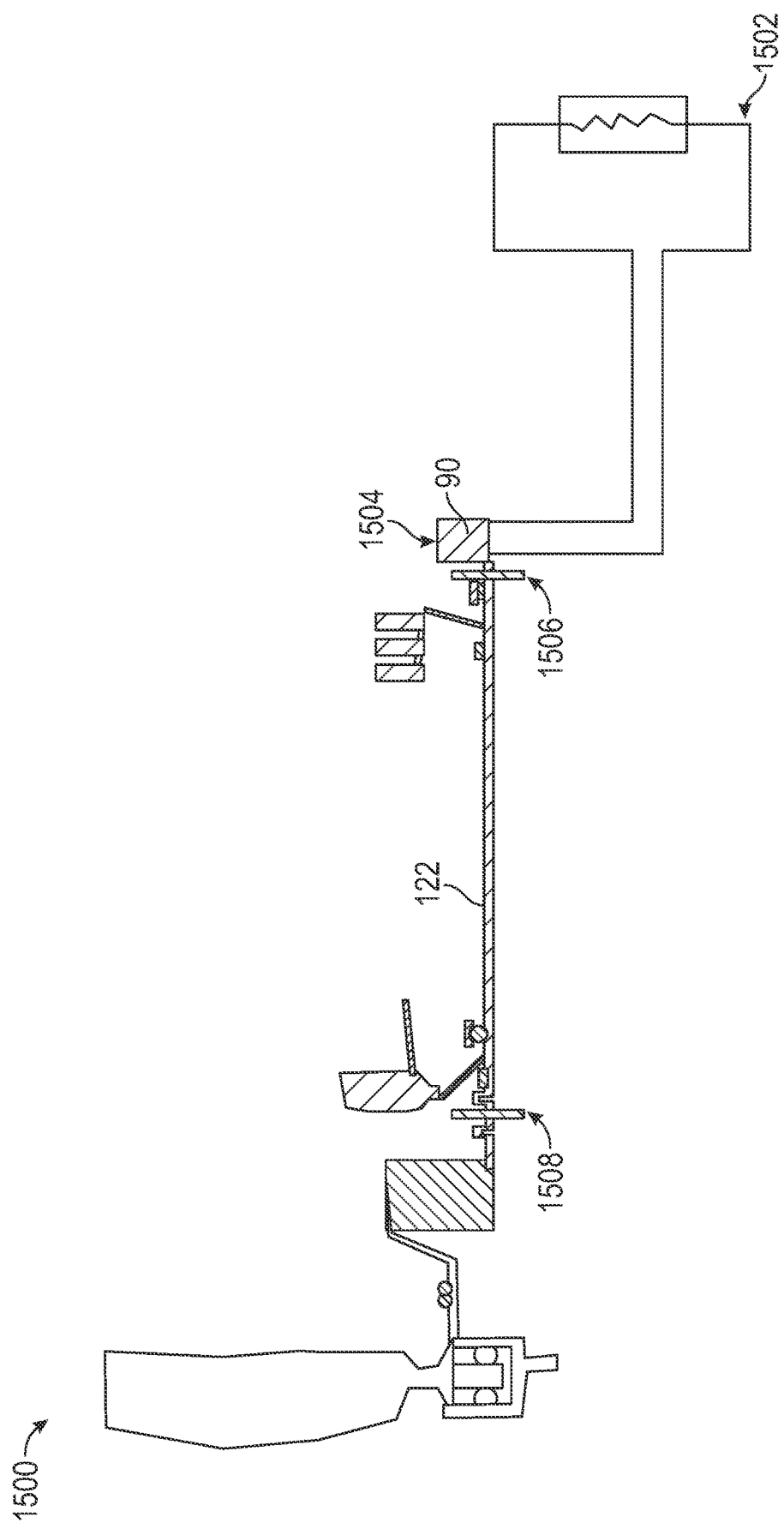
FIG. 15 illustrates a schematic view of assemblies for taking corrective action, according to the present disclosure.

Several exemplary systems to perform this action are illustrated in FIG. 15. FIG. 15 illustrates a portion of the engine of FIG. 2 with features removed for clarity. Although illustrated with respect to the engine of FIG. 2, the systems of FIG. 15 may be employed in the engine 10 of FIG. 1. Additionally, it is to be understood that the systems for taking action described with respect to FIG. 15 may be employed in any of the sensor systems described with respect to FIGS. 3A to 14B.

Referring to FIG. 15, an engine 1500 includes the low-speed shaft 122 and the electric machine 90. A first damping system 1502 to dampen the vibrations in the low-speed shaft 122 may be associated with the electric machine 90. The first damping system 1502 may vary the electric load demand on the electric machine 90 to provide damping of the torsional vibration in the low-speed shaft 122.

With continued reference to FIG. 15, a second damping system 1504 may be a variable torsional damper located on the low-speed shaft 122 longitudinal near the electric machine 90. The torsional damper may be any known torsional damper. The torsional damper provides damping of the torsional vibration in the low-speed shaft 122. The torsional damper may provide variable damping that may be controlled by a feedback loop, as described below. In other examples, the torsional damper may be a fixed damping value. In such an example, a feedback loop may not be employed as the torsional damping applied to the low-speed shaft 122 would be fixed. The torsional damper may be a mechanical damper.

A third damping system 1506 may be a clutch on an aft end of the low-speed shaft 122. The clutch of the third damping system 1506 may be located longitudinally between the bearing (e.g., second bearing assembly 135 described with respect to FIG. 6A) and the electric machine 90. A fourth damping system 1508 may be a clutch on a forward end of the low-speed shaft 122. The clutch of the fourth damping system 1508 may be located longitudinally between the gearbox assembly (e.g., gearbox assembly 150 described with respect to FIG. 6A) and the low-pressure compressor (e.g., low-pressure compressor 121 described with respect to FIG. 6A). Either or both clutches may be provided with the low-speed shaft 122. The clutches provided damping of the torsional vibration in the low-speed shaft 122. Other locations of the clutches along the low-speed shaft 122 are contemplated.

The aforementioned damping systems may be used in a feedback loop with the monitoring systems of the present disclosure. That is, monitoring of the torsional vibration may be continuous and may provide the damping systems with the torsional vibration level. If the vibration level is above a predetermined value, the damping systems may activate to damping the vibrations in the low-speed shaft. Monitoring continues and updated vibration levels are detected. The damping systems may continue to be employed to maintain the vibration levels within the acceptable range. Thus, a closed feedback loop is provided for monitoring and damping of the vibrations in the low-speed shaft.

Any of the aforementioned damping systems for effectuating remedial actions may be provided alone or in combination with the other damping systems. Additionally, a maintenance message may be generated to alert a user to further remediation required when the engine ceases to function. The maintenance message may indicate an immediacy of the maintenance required based on the measured torsional vibration.

Accordingly, the sensor assemblies of the present disclosure provide systems to monitor and to detect parameters that can indicate torsional dynamics, that is, torsional vibration performance in an engine. The sensor assemblies monitor various parameters, such as, for example, dynamic pressure in the engine flowpath, electric machine parameters, torsional displacement by way of time lag between magnetic sensors or light probes, optical or high speed camera images, or torsional displacement by way of incremental rotary encoders. Monitoring the various parameters in the model, either physical or virtual, allows for monitoring of torsional vibration in a field engine and, can, allow for corrective or remedial actions to be taken if the torsional vibration extends outside a predetermined acceptable range.

Further aspects are provided by the subject matter of the following clauses.

A gas turbine engine has a sensor assembly configured to detect torsional vibration, the gas turbine engine including a fan section having a plurality of fan blades, the fan section configured to generate an airflow through the gas turbine engine, an airflow passage having a core passage configured to guide a first portion of the airflow from an inlet to an exhaust nozzle, and a bypass passage separate from the core passage and configured to guide a second portion of the airflow to bypass the core passage, a low-speed shaft coupled to and configured to rotate the plurality of fan blades, and a sensor assembly coupled to the gas turbine engine and configured to detect torsional vibration in the low-speed shaft, the sensor assembly including a plurality of dynamic pressure sensors in the airflow passage, the plurality of dynamic pressure sensors detecting a dynamic pressure of the airflow passage that is indicative of the torsional vibration in the low-speed shaft, the sensor assembly being configured to monitor torsional vibration in the gas turbine engine, and a damping system configured to dampen the torsional vibration in the low-speed shaft based on a correlation of a measured torsional vibration and an experimental torsional vibration.

The gas turbine engine of the preceding clause, the plurality of dynamic pressure sensors including at least one dynamic pressure sensor in the core passage and at least one dynamic pressure sensor in the bypass passage.

The gas turbine engine of any preceding clause, further including a low-pressure compressor and a low-pressure turbine.

The gas turbine engine of the preceding clause, wherein at least one dynamic pressure sensor of the plurality of dynamic pressure sensors is located at the fan section, the low-pressure compressor, or the low-pressure turbine.

The gas turbine engine of any preceding clause, the damping system including a mechanical damper.

The gas turbine engine of any preceding clause, the damping system including an electrical damper.

The gas turbine engine of any preceding clause, the damping system including one or more clutches coupled to the low-speed shaft.

The gas turbine engine of any preceding clause, the damping system including a torsional damper coupled to the low-speed shaft.

The gas turbine engine of any preceding clause, further including an electric machine, the damping system configured to vary a load of the electric machine.

The gas turbine engine of any preceding clause, the plurality of dynamic pressure sensors including a first dynamic pressure sensor, a second dynamic pressure sensor, and a third dynamic pressure sensor.

The gas turbine engine of any preceding clause, the first dynamic pressure sensor being located in the bypass passage.

The gas turbine engine of any preceding clause, the first dynamic pressure sensor being located aft of the fan section.

The gas turbine engine of any preceding clause, further including an outlet guide vane, the first dynamic pressure sensor located forward of the outlet guide vane.

The gas turbine engine of any preceding clause, the second dynamic pressure sensor being located in the core passage.

The gas turbine engine of any preceding clause, further including a low-pressure compressor, the second dynamic pressure sensor being located aft of the low-pressure compressor.

The gas turbine engine of any preceding clause, the third dynamic pressure sensor being located in the core passage.

The gas turbine engine of any preceding clause, further including a low-pressure turbine, the third dynamic pressure sensor being located aft of the low-pressure turbine and forward of the exhaust nozzle.

The gas turbine engine of any preceding clause, the sensor assembly further including at least one strain gauge that is configured to be a filter to filter out noise from the plurality of dynamic pressure sensors.

The gas turbine engine of any preceding clause, further including a bearing assembly having a bearing housing support, the bearing assembly coupled to the fan section, the at least one strain gauge being located on the bearing housing support of the bearing assembly.

The gas turbine engine of any preceding clause, further including a forward bearing assembly located forward of the low-pressure compressor, the at least one strain gauge located on a bearing housing of the forward bearing assembly.

The gas turbine engine of any preceding clause, further including a gearbox assembly coupled between the fan section and the low-speed shaft, the at least one strain gauge including a second strain gauge located on a stator of the gearbox assembly.

The gas turbine engine of any preceding clause, the sensor assembly further including an accelerometer that is configured to be a filter to filter out noise from the plurality of dynamic pressure sensors.

The gas turbine engine of any preceding clause, further including an outlet guide vane having a frame, the accelerometer being located on the frame of the outlet guide vane.

The gas turbine engine of any preceding clause, wherein the gas turbine engine is an unducted gas turbine engine.

turbine engine of any preceding clause, wherein the gas turbine engine is a ducted gas turbine engine.

A gas turbine engine including a fan section having a plurality of fan blades, the fan section configured to generate an airflow through the gas turbine engine; an airflow passage having a core passage configured to guide a first portion of the airflow from an inlet to an exhaust nozzle; and a bypass passage separate from the core passage and configured to guide a second portion of the airflow to bypass the core passage; a low-speed shaft coupled to and configured to rotate the plurality of fan blades; and a sensor assembly coupled to the gas turbine engine and configured to detect torsional vibration in the low-speed shaft, the sensor assembly including at least one dynamic pressure sensor in the airflow passage and configured to detect a dynamic pressure of the airflow passage that is indicative of the torsional vibration in the low-speed shaft; and a strain gauge or an accelerometer coupled to a static component of the gas turbine engine, the strain gauge or the accelerometer configured to be a filter to filter out noise from the at least one dynamic pressure sensor.

The gas turbine engine of any preceding clause, further including the strain gauge and a bearing assembly having a bearing housing support, the bearing assembly coupled to the fan section, the strain gauge being located on the bearing housing support of the bearing assembly.

The gas turbine engine of any preceding clause, further including a forward bearing assembly located forward of the low-pressure compressor, the strain gauge located on a bearing housing of the forward bearing assembly.

The gas turbine engine of any preceding clause, further including a gearbox assembly coupled between the fan section and the low-speed shaft, the strain gauge including a second strain gauge located on a stator of the gearbox assembly.

The gas turbine engine of any preceding clause, the sensor assembly further including the accelerometer.

The gas turbine engine of any preceding clause, further including an outlet guide vane having a frame, the accelerometer being located on the frame of the outlet guide vane.

The gas turbine engine of any preceding clause, the at least one dynamic pressure sensor being located in the core passage.

The gas turbine engine of any preceding clause, further including the strain gauge and the accelerometer.

The gas turbine engine of any preceding clause, the at least one dynamic pressure sensor including a first dynamic pressure sensor located in the core passage and a second dynamic pressure sensor located in the bypass passage.

The gas turbine engine of any preceding clause, further including a damping system configured to dampen the torsional vibration in the low-speed shaft based on a correlation of a measured torsional vibration and an experimental torsional vibration.

The gas turbine engine of any preceding clause, the damping system including a mechanical damper.

The gas turbine engine of any preceding clause, the damping system including an electrical damper.

The gas turbine engine of any preceding clause, the damping system including one or more clutches coupled to the low-speed shaft.

The gas turbine engine of any preceding clause, the damping system including a torsional damper coupled to the low-speed shaft.

The gas turbine engine of any preceding clause, further including an electric machine, the damping system configured to vary a load of the electric machine.

The gas turbine engine of any preceding clause, wherein the gas turbine engine is an unducted gas turbine engine.

turbine engine of any preceding clause, wherein the gas turbine engine is a ducted gas turbine engine.

A gas turbine engine including a fan, a low-pressure turbine, a low-pressure compressor, a low-speed shaft drivingly connecting the low-pressure turbine to the low-pressure compressor and the fan, an electric machine operably coupled to the low-speed shaft, and a sensor assembly coupled to the electric machine and configured to detect torsional vibration in the low-speed shaft, the sensor assembly including a voltage sensor configured to sense a time domain data indicative of torsional vibration of the low-speed shaft.

The gas turbine engine of the preceding clause, wherein the time domain data is voltage time domain data or current time domain data.

The gas turbine engine of any preceding clause, further comprising an ammeter configured to cancel out noise from the electric machine.

The gas turbine engine of any preceding clause, wherein the ammeter is coupled to the electric machine.

The gas turbine engine of the preceding clause, the electric machine being coupled to the low-speed shaft at an aft end of the low-speed shaft.

The gas turbine engine of any preceding clause, further including a gearbox assembly coupled between the fan and the low-speed shaft, the electric machine being coupled to the gearbox assembly.

The gas turbine engine of any preceding clause, further including a gearbox assembly coupled between the fan and the low-speed shaft, the electric machine being coupled to a coupling region between the gearbox assembly and the low-speed shaft.

The gas turbine engine of any preceding clause, further including a damping system configured to dampen the torsional vibration in the low-speed shaft based on a correlation of a measured torsional vibration and an experimental torsional vibration.

The gas turbine engine of any preceding clause, the damping system including a mechanical damper.

The gas turbine engine of any preceding clause, the damping system including an electrical damper.

The gas turbine engine of any preceding clause, the damping system including one or more clutches coupled to the low-speed shaft.

The gas turbine engine of any preceding clause, the damping system including a torsional damper coupled to the low-speed shaft.

The gas turbine engine of any preceding clause, further including an electric machine, the damping system configured to vary a load of the electric machine.

The gas turbine engine of any preceding clause, wherein the gas turbine engine is an unducted gas turbine engine.

The gas turbine engine of any preceding clause, wherein the gas turbine engine is a ducted gas turbine engine.

A gas turbine engine including a fan, a low-pressure turbine, a low-pressure compressor, a low-speed shaft drivingly connecting the low-pressure turbine to the low-pressure compressor and the fan, an electric machine operably coupled to the low-speed shaft, and a sensor assembly coupled to the electric machine and configured to detect torsional vibration in the low-speed shaft, the sensor assembly including a plurality of magnetic sensors coupled to the gas turbine engine and configured to detect a time lag between the plurality of magnetic sensors indicative of torsional vibration of the low-speed shaft.

The gas turbine engine of the preceding clause, wherein at least two magnetic sensors of the plurality of magnetic sensors are located at substantially the same radial location with respect to a longitudinal centerline axis of the gas turbine engine.

The gas turbine engine of any preceding clause, wherein at least two magnetic sensors of the plurality of magnetic sensors are spaced axially apart along a longitudinal centerline axis of the gas turbine engine.

The gas turbine engine of the preceding clause, further including a fan shaft operably coupled between the fan and the low-speed shaft, the plurality of magnetic sensors including a magnetic sensor coupled to a fan shaft bearing assembly of the fan shaft.

The gas turbine engine of any preceding clause, further including a first aft bearing assembly located adjacent the low pressure compressor, the plurality of magnetic sensors including a magnetic sensor coupled to the first aft bearing assembly.

The gas turbine engine of any preceding clause, further including a second aft bearing assembly located adjacent the high pressure turbine, the plurality of magnetic sensors including a magnetic sensor coupled to the second aft bearing assembly.

The gas turbine engine of any preceding clause, the plurality of magnetic sensors including a magnetic sensor coupled to the electric machine.

The gas turbine engine of any preceding clause, further including a magnetic strip coupled to a rotating part and aligned with each magnetic sensor of the plurality of magnetic sensors, each magnetic sensor being configured to generate a signal when the magnetic strip passes the respective magnetic sensor.

The gas turbine engine of any preceding clause, wherein the plurality of magnetic sensors include a magnetic material, a magnetic indicator, a magnetic protrusion, a magnetic induction sensor, or a combination thereof.

The gas turbine engine of the preceding clause, further including a filter configured to process the signal.

The gas turbine engine of any preceding clause, the magnetic sensors being magnetic induction sensors.

The gas turbine engine of any preceding clause, further including a gearbox assembly, the gearbox assembly including a plurality of magnetic protrusions extending from an outer surface of the gearbox assembly, a first magnetic sensor of the plurality of magnetic sensors being configured to sense a magnetic flux change as the plurality of magnetic protrusions pass the first magnetic sensor.

The gas turbine engine of any preceding clause, further including a plurality of magnetic protrusions extending from an outer surface of the electric machine, a second magnetic sensor of the plurality of magnetic sensors being configured to sense a magnetic flux change as the plurality of magnetic protrusions pass the second magnetic sensor.

The gas turbine engine of any preceding clause, further including a damping system configured to dampen the torsional vibration in the low-speed shaft based on a correlation of a measured torsional vibration and an experimental torsional vibration.

The gas turbine engine of any preceding clause, the damping system including a mechanical damper.

The gas turbine engine of any preceding clause, the damping system including an electrical damper.

The gas turbine engine of any preceding clause, the damping system including one or more clutches coupled to the low-speed shaft.

The gas turbine engine of any preceding clause, the damping system including a torsional damper coupled to the low-speed shaft.

The gas turbine engine of any preceding clause, further including an electric machine, the damping system configured to vary a load of the electric machine.

The gas turbine engine of any preceding clause, wherein the gas turbine engine is an unducted gas turbine engine.

The gas turbine engine of any preceding clause, wherein the gas turbine engine is a ducted gas turbine engine.

A method of calculating dynamic torque of a low-speed shaft in a gas turbine engine, the method including coupling a sensor assembly to a low-speed shaft of the gas turbine engine, collecting time domain data, filtering at least a portion of the time domain data to generate filtered data, plotting the filtered data as a function of time, processing the filtered data to obtain a frequency of vibration of the low-speed shaft, calculating dynamic torque of the low-speed shaft based on the frequency of vibration of the shaft.

The method of the preceding clause, further comprising filtering the data with a with a band pass filter to generate the filtered data.

The method of any preceding clause, wherein collecting time domain data comprises sensing voltage with one or more voltage sensors, the time domain data comprising time domain voltage data.

The method of the preceding clause, wherein the one or more voltage sensors are coupled to an electric machine of the gas turbine engine.

The method of any preceding clause, further comprising filtering noise from the time domain voltage data with one or more ammeters coupled to the electric machine.

The method of any preceding clause, wherein collecting time domain data comprises sensing pressure with one or more pressure sensors, the time domain data comprising time domain pressure data.

The method of the preceding clause, wherein sensing pressure comprises sensing pressure in a bypass passage of the gas turbine engine between a fan and an outlet guide vane, sensing pressure in a core passage of the gas turbine engine between a low-pressure compressor and a frame, sensing pressure in the core passage of the gas turbine engine between a low-pressure turbine and an exhaust nozzle, or any combination thereof.

The method of any preceding clause, further comprising canceling noise from the time domain pressure data with data from one or more strain gauges.

The method of any preceding clause, further comprising canceling noise from the time domain pressure data with data from one or more strain gauges and one or more accelerometers.

The method of any preceding clause, further including damping the vibration of the low-speed shaft based on the calculated dynamic torque.

The method of any preceding clause, further comprising mechanical damping the vibration of the low-speed shaft.

The method of any preceding clause, further comprising electrically damping the vibration of the low-speed shaft.

The method of any preceding clause, further comprising damping the vibration of the low-speed shaft with one or more clutches coupled to the low-speed shaft.

The method of any preceding clause, further comprising damping the vibration of the low-speed shaft with a torsional damper coupled to the low-speed shaft.

The method of any preceding clause, further comprising damping the vibration of the low-speed shaft by varying a load of an electric machine coupled to the low-speed shaft.

The method of any preceding clause, wherein the gas turbine engine is an unducted gas turbine engine.

The method of any preceding clause, wherein the gas turbine engine is a ducted gas turbine engine.

A gas turbine engine including a fan, a low-pressure turbine, a low-pressure compressor, a low-speed shaft drivingly connecting the low-pressure turbine to the low-pressure compressor and the fan, an electric machine operably coupled to the low-speed shaft, and a sensor assembly coupled to the gas turbine engine and configured to detect torsional vibration in the low-speed shaft, the sensor assembly including a forward light probe coupled to the gas turbine engine and an aft light probe coupled to the gas turbine engine, the sensor assembly being configured to detect a difference from a first signal of the forward light probe and a second signal of the aft light probe, the difference being indicative of the torsional vibration in the low-speed shaft.

The gas turbine engine of the preceding clause, further including a gearbox assembly coupled between the fan and the low-speed shaft, the forward light probe being coupled to a bearing assembly of the gearbox assembly and the aft light probe is coupled to a bearing assembly of the electric machine.

The gas turbine engine of any preceding clause, the forward light probe and the aft light probe each being configured to detect reflected light from a light source or to detect absence of light from a light source as a plurality of bearings rotate past the forward light probe and the aft light probe, respectively.

The gas turbine engine of any preceding clause, further including a damping system configured to dampen the torsional vibration in the low-speed shaft based on a correlation of a measured torsional vibration and an experimental torsional vibration.

The gas turbine engine of any preceding clause, the damping system including a mechanical damper.

The gas turbine engine of any preceding clause, the damping system including an electrical damper.

The gas turbine engine of any preceding clause, the damping system including one or more clutches coupled to the low-speed shaft.

The gas turbine engine of any preceding clause, the damping system including a torsional damper coupled to the low-speed shaft.

The gas turbine engine of any preceding clause, further including an electric machine, the damping system configured to vary a load of the electric machine.

The gas turbine engine of any preceding clause, wherein the gas turbine engine is an unducted gas turbine engine.

The gas turbine engine of any preceding clause, wherein the gas turbine engine is a ducted gas turbine engine.

A gas turbine engine including a fan, a low-pressure turbine, a low-pressure compressor, a low-speed shaft drivingly connecting the low-pressure turbine to the low-pressure compressor and the fan, a fan shaft coupled between the fan and the low-speed shaft, an electric machine operably coupled to the low-speed shaft, and a sensor assembly coupled to the gas turbine engine and configured to detect torsional vibration in the low-speed shaft, the sensor assembly having a forward incremental rotary encoder coupled to the fan shaft and an aft incremental rotary encoder coupled to the low-speed shaft, each of the forward incremental rotary encoder and the aft incremental rotary encoder being configured to detect angular displacement of the low-speed shaft indicative of torsional vibration.

The gas turbine engine of the preceding clause, further including a gearbox assembly, the gearbox assembly including another incremental rotary encoder configured to detect a transmission error indicative of the torsional vibration of the low-speed shaft.

The gas turbine engine of any preceding clause, further including a damping system configured to dampen the torsional vibration in the low-speed shaft based on a correlation of a measured torsional vibration and an experimental torsional vibration.

The gas turbine engine of any preceding clause, the damping system including a mechanical damper.

The gas turbine engine of any preceding clause, the damping system including an electrical damper.

The gas turbine engine of any preceding clause, the damping system including one or more clutches coupled to the low-speed shaft.

The gas turbine engine of any preceding clause, the damping system including a torsional damper coupled to the low-speed shaft.

The gas turbine engine of any preceding clause, further including an electric machine, the damping system configured to vary a load of the electric machine.

The gas turbine engine of any preceding clause, wherein the gas turbine engine is an unducted gas turbine engine.

The gas turbine engine of any preceding clause, wherein the gas turbine engine is a ducted gas turbine engine.

A method of monitoring dynamic torque and torsional frequency in a low-speed shaft of a gas turbine engine, the method comprising locating one or more sensors on a low-speed shaft of the gas turbine engine to generate a sensor assembly on the gas turbine engine, modeling the sensor assembly on a virtual gas turbine engine on a computer with a processor, collecting data with the sensor assembly on the gas turbine engine, filtering the data to generate filtered data, processing the filtered data to determine a frequency and magnitude of torsional vibration of the low-speed shaft, plotting the frequency and magnitude of torsional vibration, and calculating dynamic torque based on the frequency and magnitude of the torsional vibration.

The method of the preceding clause, wherein the one or more sensors are one or more incremental rotary encoders.

The method of any preceding clause, wherein the one or more sensors are one or more magnetic sensors.

The method of any preceding clause, wherein the one or more sensors are one or more light probes.

The method of the preceding clause, further comprising filtering the data with a with a band pass filter to generate the filtered data.

The method of any preceding clause, further including damping the vibration of the low-speed shaft based on the calculated dynamic torque.

The method of any preceding clause, further comprising mechanical damping the vibration of the low-speed shaft.

The method of any preceding clause, further comprising electrically damping the vibration of the low-speed shaft.

The method of any preceding clause, further comprising damping the vibration of the low-speed shaft with one or more clutches coupled to the low-speed shaft.

The method of any preceding clause, further comprising damping the vibration of the low-speed shaft with a torsional damper coupled to the low-speed shaft.

The method of any preceding clause, further comprising damping the vibration of the low-speed shaft by varying a load of an electric machine coupled to the low-speed shaft.

The method of any preceding clause, wherein the gas turbine engine is an unducted gas turbine engine.

The method of any preceding clause, wherein the gas turbine engine is a ducted gas turbine engine.

A gas turbine engine including a fan, a low-pressure turbine, a low-pressure compressor, a low-speed shaft drivingly connecting the low-pressure turbine to the low-pressure compressor and the fan, and a sensor assembly coupled to the gas turbine engine, the sensor assembly having an optical sensor coupled to a static component of the gas turbine engine and an indicator coupled to a rotating component of the gas turbine engine, the optical sensor configured to detect the indicator as the indicator rotates past the optical sensor to detect a rotor speed of the rotating object and to detect passage of the indicator to indicate the presence of torsional fluctuation in the low-speed shaft.

The gas turbine engine of the preceding clause, the rotating component being a downstream most stage of the low-pressure turbine.

The gas turbine engine of any preceding clause, wherein the optical sensor is located on a stator frame downstream of a downstream most stage of the low-pressure turbine.

The gas turbine engine of any preceding clause, wherein the optical sensor is located on a housing extending radially inward from a frame of the gas turbine engine.

The gas turbine engine of any preceding clause, wherein the optical sensor is located upstream of a first stage of the low-pressure turbine on a frame forward of the low-pressure turbine.

The gas turbine engine of any preceding clause, wherein the optical sensor is located in a forward section of the gas turbine engine.

The gas turbine engine of any preceding clause, wherein the optical sensor is located near a low-pressure compressor of the gas turbine engine.

The gas turbine engine of any preceding clause, wherein the optical sensor is located in the gas turbine engine so as to sense a rotating bolt within the gas turbine engine.

The gas turbine engine of any preceding clause, wherein the optical sensor is located on a stator of a gearbox assembly of the gas turbine engine.

The gas turbine engine of any preceding clause, wherein the optical sensor comprises a plurality of optical sensors.

The gas turbine engine of any preceding clause, wherein the optical sensor comprises at least two optical sensors located at substantially the same radial location with respect to a centerline axis of the gas turbine engine.

The gas turbine engine of any preceding clause, further including a damping system configured to dampen the torsional vibration in the low-speed shaft based on a correlation of a measured torsional vibration and an experimental torsional vibration.

The gas turbine engine of any preceding clause, the damping system including a mechanical damper.

The gas turbine engine of any preceding clause, the damping system including an electrical damper.

The gas turbine engine of any preceding clause, the damping system including one or more clutches coupled to the low-speed shaft.

The gas turbine engine of any preceding clause, the damping system including a torsional damper coupled to the low-speed shaft.

The gas turbine engine of any preceding clause, further including an electric machine, the damping system configured to vary a load of the electric machine.

The gas turbine engine of any preceding clause, wherein the gas turbine engine is an unducted gas turbine engine.

The gas turbine engine of any preceding clause, wherein the gas turbine engine is a ducted gas turbine engine.

A gas turbine engine including a fan, a low-pressure turbine, a low-pressure compressor, a low-speed shaft drivingly connecting the low-pressure turbine to the low-pressure compressor and the fan, and a sensor assembly coupled to the gas turbine engine, the sensor assembly having a high speed camera coupled to a static component of the gas turbine engine and an indicator coupled to a rotating component of the gas turbine engine, the high-speed sensor configured to detect the indicator as the indicator rotates past the high speed camera and configured to indicate the presence of torsional fluctuation in the low-speed shaft.

The gas turbine engine of the preceding clause, further including a screen in front of the high speed camera for protection of the high speed camera.

The gas turbine engine of the preceding clause, the rotating component being a downstream most stage of the low-pressure turbine.

The gas turbine engine of any preceding clause, wherein the high speed camera is located on a stator frame downstream of a downstream most stage of the low-pressure turbine.

The gas turbine engine of any preceding clause, wherein the high speed camera is located on a housing extending radially inward from a frame of the gas turbine engine.

The gas turbine engine of any preceding clause, wherein the high speed camera is located upstream of a first stage of the low-pressure turbine on a frame forward of the low-pressure turbine.

The gas turbine engine of any preceding clause, wherein the high speed camera is located in a forward section of the gas turbine engine.

The gas turbine engine of any preceding clause, wherein the high speed camera is located near a low-pressure compressor of the gas turbine engine.

The gas turbine engine of any preceding clause, wherein the high speed camera is located in the gas turbine engine so as to sense a rotating bolt within the gas turbine engine.

The gas turbine engine of any preceding clause, wherein the high speed camera is located on a stator of a gearbox assembly of the gas turbine engine.

The gas turbine engine of any preceding clause, wherein the high speed camera comprises a plurality of high speed cameras.

The gas turbine engine of any preceding clause, wherein the high speed camera comprises at least two high speed cameras located at substantially the same radial location with respect to a centerline axis of the gas turbine engine.

The gas turbine engine of any preceding clause, further including a damping system configured to dampen the torsional vibration in the low-speed shaft based on a correlation of a measured torsional vibration and an experimental torsional vibration.

The gas turbine engine of any preceding clause, the damping system including a mechanical damper.

The gas turbine engine of any preceding clause, the damping system including an electrical damper.

The gas turbine engine of any preceding clause, the damping system including one or more clutches coupled to the low-speed shaft.

The gas turbine engine of any preceding clause, the damping system including a torsional damper coupled to the low-speed shaft.

The gas turbine engine of any preceding clause, further including an electric machine, the damping system configured to vary a load of the electric machine.

The gas turbine engine of any preceding clause, wherein the gas turbine engine is an unducted gas turbine engine.

The gas turbine engine of any preceding clause, wherein the gas turbine engine is a ducted gas turbine engine.

A method of monitoring torsional vibration in the gas turbine engine of any preceding clause.

A method of calculating dynamic torque in the gas turbine engine of any preceding clause.

A method of monitoring torsion in a low-speed shaft of a gas turbine engine, the method comprising locating one or more sensors at a target location within the gas turbine engine, collecting data with the sensor assembly on the gas turbine engine to generate collected data, calculating the torsion of the low-speed shaft based on the collected data, generating a correlation chart between the collected data and experimental data, monitoring the torsion e data to generate filtered data, processing the filtered data to determine a frequency and magnitude of torsional vibration of the low-speed shaft, plotting the frequency and magnitude of torsional vibration, and calculating dynamic torque based on the frequency and magnitude of the torsional vibration.

The method of the preceding clause, wherein the one or more sensors are one or more optical sensors.

The method of any preceding clause, wherein the one or more sensors are one or more high speed cameras.

The method of any preceding clause, further comprising locating a first sensor of the one or more sensors axially spaced along a longitudinal centerline axis of the gas turbine engine from a second sensor of the one or more sensors.

The method of any preceding clause, wherein the target location is configured to sense a rotating component of the gas turbine engine.

The method of any preceding clause, wherein the target location is a downstream most stage of the low-pressure turbine.

The method of any preceding clause, wherein the target location is a stator frame downstream of a downstream most stage of the low-pressure turbine.

The method of any preceding clause, wherein the target location is a housing extending radially inward from a frame of the gas turbine engine.

The method of any preceding clause, wherein the target location is upstream of a first stage of the low-pressure turbine on a frame forward of the low-pressure turbine.

The method of any preceding clause, wherein the target location is a forward section of the gas turbine engine.

The method of any preceding clause, wherein the target location is a low-pressure compressor of the gas turbine engine.

The method of any preceding clause, wherein the target location is configured to sense a rotating bolt within the gas turbine engine.

The method of any preceding clause, wherein the target location is a stator of a gearbox assembly of the gas turbine engine.

The method of any preceding clause, further including damping the vibration of the low-speed shaft based on the calculated dynamic torque.

The method of any preceding clause, further comprising mechanical damping the vibration of the low-speed shaft.

The method of any preceding clause, further comprising electrically damping the vibration of the low-speed shaft.

The method of any preceding clause, further comprising damping the vibration of the low-speed shaft with one or more clutches coupled to the low-speed shaft.

The method of any preceding clause, further comprising damping the vibration of the low-speed shaft with a torsional damper coupled to the low-speed shaft.

The method of any preceding clause, further comprising damping the vibration of the low-speed shaft by varying a load of an electric machine coupled to the low-speed shaft.

The method of any preceding clause, wherein the gas turbine engine is an unducted gas turbine engine.

The method of any preceding clause, wherein the gas turbine engine is a ducted gas turbine engine.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gas turbine engine having a sensor assembly configured to detect torsional vibration, the gas turbine engine comprising:
    a fan section having a plurality of fan blades, the fan section configured to generate an airflow through the gas turbine engine;
    an airflow passage having:
        a core passage configured to guide a first portion of the airflow from an inlet to an exhaust nozzle; and
        a bypass passage separate from the core passage and configured to guide a second portion of the airflow to bypass the core passage;
    a low-speed shaft coupled to and configured to rotate the plurality of fan blades;
    a sensor assembly comprising a plurality of dynamic pressure sensors in the airflow passage, the plurality of dynamic pressure sensors detecting a dynamic pressure of the airflow passage that is indicative of torsional vibration in the low-speed shaft, a processor configured to determine a measured torsional vibration from the detected dynamic pressure; and
    a damping system configured to dampen the torsional vibration in the low-speed shaft based on a correlation of the measured torsional vibration and an experimental torsional vibration.

2. The gas turbine engine of claim 1, wherein the plurality of dynamic pressure sensors include at least one dynamic pressure sensor in the core passage and at least one dynamic pressure sensor in the bypass passage.

3. The gas turbine engine of claim 1, further comprising a low-pressure compressor and a low-pressure turbine, wherein at least one dynamic pressure sensor of the plurality of dynamic pressure sensors is located at the fan section, the low-pressure compressor, or the low-pressure turbine.

4. The gas turbine engine of claim 1, wherein the damping system comprises a mechanical damper.

5. The gas turbine engine of claim 1, wherein the damping system comprises an electrical damper.

6. The gas turbine engine of claim 1, wherein the damping system comprises one or more clutches or a torsional damper coupled to the low-speed shaft.

7. The gas turbine engine of claim 1, further comprising an electric machine, the damping system configured to vary a load of the electric machine.

8. The gas turbine engine of claim 1, wherein the plurality of dynamic pressure sensors includes a first dynamic pressure sensor, a second dynamic pressure sensor, and a third dynamic pressure sensor.

9. The gas turbine engine of claim 8, wherein the first dynamic pressure sensor is located in the bypass passage.

10. The gas turbine engine of claim 9, wherein the first dynamic pressure sensor is located aft of the fan section.

11. The gas turbine engine of claim 10, further comprising an outlet guide vane, the first dynamic pressure sensor located forward of the outlet guide vane.

12. The gas turbine engine of claim 8, wherein the second dynamic pressure sensor is located in the core passage.

13. The gas turbine engine of claim 12, further comprising a low-pressure compressor, wherein the second dynamic pressure sensor is located aft of the low-pressure compressor.

14. The gas turbine engine of claim 8, wherein the third dynamic pressure sensor is located in the core passage.

15. The gas turbine engine of claim 14, further comprising a low-pressure turbine, wherein the third dynamic pressure sensor is located aft of the low-pressure turbine and forward of the exhaust nozzle.

16. The gas turbine engine of claim 1, wherein the sensor assembly further comprises at least one strain gauge that is configured to be a filter to filter out noise from the plurality of dynamic pressure sensors.

17. The gas turbine engine of claim 16, further comprising a bearing assembly having a bearing housing support, the bearing assembly coupled to the fan section, wherein the at least one strain gauge is located on the bearing housing support of the bearing assembly.

18. The gas turbine engine of claim 17, further comprising a gearbox assembly coupled between the fan section and the low-speed shaft, wherein the at least one strain gauge comprises a second strain gauge located on a stator of the gearbox assembly.

19. The gas turbine engine of claim 16, wherein the sensor assembly further comprises an accelerometer that is configured to be a filter to filter out noise from the plurality of dynamic pressure sensors.

20. The gas turbine engine of claim 19, further comprising an outlet guide vane having a frame, wherein the accelerometer is located on the frame of the outlet guide vane.

* * * * *